(12) United States Patent
Yagisawa et al.

(10) Patent No.: US 7,383,380 B2
(45) Date of Patent: Jun. 3, 2008

(54) ARRAY-TYPE DISK APPARATUS PREVENTING LOST DATA AND PROVIDING IMPROVED FAILURE TOLERANCE

(75) Inventors: Ikuya Yagisawa, Tokyo (JP); Takeki Okamoto, Odawara (JP); Naoto Matsunami, Hayama (JP); Mikio Fukuoka, Odawara (JP); Toshio Nakano, Chigasaki (JP); Kenichi Takamoto, Odawara (JP); Akira Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 94 days.

(21) Appl. No.: 10/775,702

(22) Filed: Feb. 9, 2004

(65) Prior Publication Data

US 2005/0081087 A1    Apr. 14, 2005

(30) Foreign Application Priority Data

Sep. 26, 2003    (JP) ............................. 2003-335465

(51) Int. Cl.
*G06F 12/00* (2006.01)

(52) U.S. Cl. ............................. 711/114; 710/20; 714/6

(58) Field of Classification Search ................ 711/114, 711/156, 161, 162; 714/6
See application file for complete search history.

(56) References Cited

U.S. PATENT DOCUMENTS

| | | | |
|---|---|---|---|
| 5,267,242 A | 11/1993 | Lavallee et al. | |
| 5,537,567 A | 7/1996 | Galbraith et al. | |
| 5,611,069 A | 3/1997 | Matoba | |
| 5,734,818 A | 3/1998 | Kern et al. | |
| 5,790,773 A * | 8/1998 | DeKoning et al. ............. | 714/6 |
| 5,802,264 A | 9/1998 | Chen et al. | |
| 5,959,860 A | 9/1999 | Styczinski | |

(Continued)

FOREIGN PATENT DOCUMENTS

JP    08-147112    6/1996

OTHER PUBLICATIONS

Patterson, D., et al. A Case for Redundant Arrays of Inexpensive Disks (RAID), Computer Science Division, Dept. of Electrical Engineering and Computer Science, University of California, Berkeley, 1988.

(Continued)

*Primary Examiner*—Donald Sparks
*Assistant Examiner*—Matthew Bradley
(74) *Attorney, Agent, or Firm*—Mattingly, Stanger, Malur & Brundidge, PC

(57) ABSTRACT

Disclosed is storage system, that is, an array-type disk apparatus which is provided with an error monitor section which monitors the status of error occurrence in a disk drive and instructs initiation of mirroring between the disk drive and a spare disk drive when the number of errors occurred of the disk drive exceeds a specified value, and a mirror section which performs mirroring between the disk drive and spare disk drive. Storage system, that is, the array-type disk apparatus may be provided with an error monitor section which monitors the status of error occurrence in a disk drive and gives such an instruction as to set the status of the disk drive in a temporary blocked state, and a data restoring section which executes data restoration by reading data from the temporary blocked disk drive when reading from another disk drive constituting a disk array group is not possible during data restoration.

22 Claims, 17 Drawing Sheets

U.S. PATENT DOCUMENTS

| | | |
|---|---|---|
| 5,974,544 A | 10/1999 | Jeffries et al. |
| 6,044,444 A | 3/2000 | Ofek |
| 6,070,249 A | 5/2000 | Lee |
| 6,154,853 A * | 11/2000 | Kedem ............... 714/6 |
| 6,223,252 B1 * | 4/2001 | Bandera et al. ........ 711/114 |
| 6,243,827 B1 | 6/2001 | Renner |
| 6,324,654 B1 | 11/2001 | Wahl et al. |
| 6,442,711 B1 | 8/2002 | Sasamoto et al. |
| 6,598,174 B1 | 7/2003 | Parks et al. |
| 6,615,314 B1 * | 9/2003 | Higaki et al. ........ 711/114 |
| 6,643,795 B1 * | 11/2003 | Sicola et al. ............ 714/6 |
| 6,647,514 B1 | 11/2003 | Umberger et al. |
| 6,799,283 B1 | 9/2004 | Tamai et al. |
| 7,043,665 B2 * | 5/2006 | Kern et al. ............ 714/5 |
| 2002/0065999 A1 * | 5/2002 | Kikuchi et al. ........ 711/162 |
| 2002/0066050 A1 | 5/2002 | Lerman et al. |
| 2003/0056142 A1 | 3/2003 | Hashemi |
| 2003/0101316 A1 | 5/2003 | Krishnamurthy |
| 2003/0120863 A1 | 6/2003 | Lee et al. |
| 2003/0120864 A1 | 6/2003 | Lee et al. |
| 2003/0120869 A1 | 6/2003 | Lee et al. |
| 2003/0188101 A1 | 10/2003 | Fore et al. |
| 2004/0160975 A1 | 8/2004 | Frank et al. |
| 2004/0190183 A1 | 9/2004 | Tamai et al. |
| 2004/0260967 A1 | 12/2004 | Guha et al. |
| 2005/0060618 A1 | 3/2005 | Guha |

OTHER PUBLICATIONS

Alvarez et al. "Tolerating multiple failures in RAID architectures with optimal storage and uniform declustering," Proceedings of the 24th annual international symposium on Computer architecture pp. 62-72 (1997).

Cohen et al. "Segmented information dispersal (SID) for efficient reconstruction in fault-tolerant video servers," Proceedings of the fourth ACM international conference on Multimedia pp. 277-286 (1997).

Hou "Comparing rebuild algorithms for mirrored and RAID5 disk arrays," Proceedings of the 1993 ACM SIGMOD international conference on Management of data pp. 317-326 (1993).

Menon et al. "Comparison of sparing alternatives for disk arrays," Proceedings of the 19th annual international symposium on Computer architecture pp. 318-329 (1992).

Mogi et al. "Hot mirroring: a method of hiding parity update penalty and degradation during rebuilds for RAID5," Proceedings of the 1996 ACM SIGMOD international conference on Management of data pp. 183-194 (1996).

Muntz et al. "Performance Analysis of Disk Arrays Under Failure," Proceedings of the 16th Conference on Very Large Databases (VLDB) pp. 162-173 (1990).

* cited by examiner

| DISK APPA-RATUS NO. | ERROR COUNTER | ERROR COUNT SPECIFIED VALUE LEVEL 1 | ERROR COUNT SPECIFIED VALUE LEVEL 2 | SPARE BIT | DISK AP-PARATUS STATUS | PAIR DISK AP-PARATUS |
|---|---|---|---|---|---|---|
| 0 | 5 | 50 | 90 | No | NORMAL | — |
| 1 | 5 | 50 | 90 | No | NORMAL | — |
| 2 | 5 | 50 | 90 | No | NORMAL | — |
| 3 | 5 | 50 | 90 | No | NORMAL | — |
| 4 | 60 | 50 | 90 | No | MIRROR | No. 5 |
| 5 | 5 | 50 | 90 | Yes | MIRROR | No. 4 |
| 6 | 5 | 50 | 90 | Yes | NORMAL | — |
| ... | | | | | | |

FIG. 5

| DISK APPA-RATUS NO. | ERROR COUNTER | ERROR COUNT SPECIFIED VALUE LEVEL 1 | ERROR COUNT SPECIFIED VALUE LEVEL 2 | SPARE BIT | DISK AP-PARATUS STATUS | PAIR DISK AP-PARATUS |
|---|---|---|---|---|---|---|
| 0 | 1 0 | 3 0 | 9 0 | No | NORMAL | — |
| 1 | 5 | 3 0 | 9 0 | No | NORMAL | — |
| 2 | 3 5 | 3 0 | 9 0 | No | MIRROR | No. 6 |
| 3 | 5 | 3 0 | 9 0 | No | NORMAL | — |
| 4 | 2 0 | 3 0 | 9 0 | No | MIRROR | No. 5 |
| 5 | 5 | 3 0 | 9 0 | Yes | MIRROR | No. 4 |
| 6 | 5 | 3 0 | 9 0 | Yes | MIRROR | No. 2 |
| ... | | | | | | |

| DISK APPA-RATUS NO. | ERROR COUNTER | ERROR COUNT SPECIFIED VALUE LEVEL 1 | SPARE BIT | DISK AP-PARATUS STATUS | PAIR DISK AP-PARATUS |
|---|---|---|---|---|---|
| 0 | 5 | 8 0 | No | RESTORING | — |
| 1 | 5 | 8 0 | No | RESTORING | — |
| 2 | 5 | 8 0 | No | RESTORING | — |
| 3 | 5 | 8 0 | No | RESTORING | — |
| 4 | 8 5 | 8 0 | No | TEMPORARY BLOCKADE | No. 5 |
| 5 | 5 | 8 0 | Yes | RESTORING | No. 4 |
| 6 | 5 | 8 0 | Yes | NORMAL | — |
| ... | | | | | |

| DISK APPA-RATUS NO. | ERROR COUNTER | ERROR COUNT SPECIFIED VALUE LEVEL 1 | ERROR COUNT SUB SPECIFIED VALUE | SPARE BIT | DISK AP-PARATUS STATUS | PAIR DISK AP-PARATUS |
|---|---|---|---|---|---|---|
| 0 | 5 | 6 0 | 4 0 | No | NORMAL | — |
| 1 | 4 0 | 6 0 | 4 0 | No | NORMAL | — |
| 2 | 5 | 6 0 | 4 0 | No | NORMAL | — |
| 3 | 4 0 | 6 0 | 4 0 | No | NORMAL | — |
| 4 | 5 | 6 0 | 4 0 | No | NORMAL | — |
| 5 | 5 | 8 0 | 4 0 | Yes | NORMAL | — |
| 6 | 5 | 8 0 | 4 0 | Yes | NORMAL | — |
| ... | | | | | | |

ARRAY-TYPE DISK APPARATUS PREVENTING LOST DATA AND PROVIDING IMPROVED FAILURE TOLERANCE

BACKGROUND OF THE INVENTION

The present invention relates to a disk drive which is an external memory device for a computer, and, more particularly, to a technique for preventing a plurality of disk drives in an array-type disk apparatus constituting a disk array from failing simultaneously and a technique for improving the host I/O response and improving the reliability at the time of data shifting among disk drives constituting a disk array group having a redundancy.

An array-type disk apparatus is one type of memory device systems which are to be connected to computers. The array-type disk apparatus is called a RAID (Redundant Arrays of Inexpensive Disks) and is a memory device which has a plurality of disk drives laid out in an array and a control section to control the disk drives. In the array-type disk apparatus, a read request (data read request) and a write request (data write request) are processed fast by the parallel operation of the disk drives and redundancy is added to data. As disclosed in Non-patent Publication 1 ("A Case for Redundant Arrays of Inexpensive Disks (RAID)", David A. Patterson, Garth Gibson, and Randy H. Katz, Computer Science Division Department of Electrical Engineering and Computer Sciences, University of California Berkeley), array-type disk apparatuses are classified into five levels according to the type of redundant data to be added and the structure.

It is typical for array-type disk apparatuses available on the market that spare disk drives are mounted beforehand in the same array-type disk apparatus on the assumption that disk drives used may fail. In case where an array-type disk apparatus decides that a disk drive which is a member of the RAID of the array-type disk apparatus or a disk array group has failed, the array-type disk apparatus restores the same data and parity of the failed disk drive in the associated spare disk drive based on the data and parity of another disk drive. After restoration, the spare disk drive operates in place of the failed disk drive.

Further, if the data and parity of a disk drive are restored after the disk drive fails, an access is made to all the disk drives constituting the RAID group, lowering the on-line performance. As a solution to this problem, there is a technique which predicts a disk drive which is likely to fail, copies data in the paired spare disk drive before the disk drive fails and becomes inaccessible, and keeps the disk operation using the spare disk drive. Patent Document 1 (Japanese Patent Laid-Open No. 147112/1996) discloses a technique which copies data of a disk drive to its spare disk drive and restores the data in the spare disk drive in case where the number of errors occurred in that disk drive exceeds a specified value.

Further, the conventional array-type disk apparatus has an operational flow such that when a data read failure occurs frequently in a disk drive from which data is shifted (hereinafter called "data-shifting disk drive") at the time of shifting data to the spare disk drive of the disk drive due to preventive maintenance or so, data read from the data-shifting disk drive is attempted and after a data read failure is detected, the data in the data-shifting disk drive is restored by the disk drive that has redundancy using the data restoring function of the array-type disk apparatus. It is therefore expected that the prior art drive suffers a slower response to the data read request from the host computer. To avoid the response drop, it is typical to perform the process of coping with the data read request from the host computer using only the system which isolates the data-shifting disk drive from the array-type disk apparatus when a data read error has occurred frequency in the data-shifting disk drive and restores the data in the data-shifting disk drive by means of the redundant disk drive by using the data restoring function of the array-type disk apparatus.

SUMMARY OF THE INVENTION

As the capacity of disk drives is ever increasing, bringing about a problem that the probability of occurrence of a data read failure in a redundant array-type disk apparatus increases in proportional to that increase. In case where a redundant array-type disk apparatus has a data unreadable portion, data in the data-shifting disk drive cannot be restored so that the data is lost as a consequence.

In case of storage system, that is, an array-type disk apparatus having redundant disk drives, i.e., one disk array group, data can be restored by using the redundancy of the array-type disk apparatus when one disk drive fails. In case of a 2 disk drives failure where, with one disk drive failing, data reading from another disk drive is disabled, data is lost.

The data restoring process of storage system, that is, an array-type disk apparatus is generally performed in parallel to an on-line process, and the capacity of the disk drives becomes larger every year, so that the data restoring time becomes longer. This increases the probability that one disk drive fails during restoration. As the capacity of the disk drives becomes larger, the time for data reading from a disk drive at the time of data restoration becomes longer, thus increasing the probability of occurrence of bit errors that cannot be recovered. It is apparent from the above that the probability of occurrence of a 2 disk drives failure of disk drives is likely to increase.

According to the prior art that copies data to a spare disk drive before its associated disk drive becomes inaccessible, if the specified value for the count of errors to be occurred which triggers the initiation of data copying to the spare disk drive is set high, the probable occurrence of possible failures is underestimated. This increases the probability of occurrence of a 2 disk drives failure. If the error count specified value level is set low, on the other hand, the frequency of usage of the spare disk drives becomes high, leading to a cost increase for the spare disk drives.

In case where an array-type disk apparatus decides that a disk drive has failed, if an attempt is made to restore the same data and parity of the failed disk drive into the spare disk drive based on the data and parity of another disk drive which is another member of the disk array group of the array-type disk apparatus but there is some data which cannot be read from that another disk drive during data restoration, data of the parity group concerning that data cannot be restored, resulting in a 2 disk drives failure.

There may be a case where while none of the disk drives constituting the disk array group of an array-type disk apparatus have not met such an event that the number of errors occurred has reached the specified value, the numbers of errors occurred of plural disk drives approach the specified value so that it is very likely to cause a 2 disk drives failure in which some of the disk drives constituting the disk array group of the array-type disk apparatus fail at a time. The prior art that starts copying data to a spare disk drive based on the number of errors occurred cannot avoid such a possible 2 disk drives failure.

In other words, there is a case where the prior art cannot cope with a 2 disk drives failure in which some of the disk drives constituting the array-type disk apparatus fail at a time.

It is the first object of the invention to provide a highly reliable storage system, that is, a highly reliable array-type disk apparatus which copies data or so to a spare disk drive for a possible failure and reduces the probability of occurrence of a 2 disk drives failure without involving a cost increase for spare disk drives.

It is the second object of the invention to provide a highly reliable array-type disk apparatus which reduces the probability of occurrence of a 2 disk drives failure when one of the disk drives constituting a disk array group has failed.

It is the third object of the invention to provide a highly reliable array-type disk apparatus which copies data or so to a spare disk drive for a possible failure and reduces the probability of occurrence of a 2 disk drives failure when a failure potential of plural disk drives constituting the array-type disk apparatus is high.

It is the fourth object of the invention to provide a highly reliable redundant array-type disk apparatus which completes data shifting without lowering the I/O response to a host computer and losing data at the time of shifting data of a disk drive in the array-type disk apparatus to its associated spare disk drive.

The invention further aims at providing a control program, control method and a data shifting method which drive the array-type disk apparatuses that achieve those four objects.

To achieve the objects, according to the invention, there is provided an array-type disk apparatus having a plurality of disk drives, wherein at least one of the disk drives of the array-type disk apparatus is a spare disk drive, and the array-type disk apparatus has an error monitor section which monitors a status of error occurrence in each of the disk drives and instructs initiation of mirroring between that disk drive and the spare disk drive when a number of errors occurred of the disk drive exceeds a specified value level 1, instructs initiation of blockade of the disk drive when the number of errors occurred of the disk drive exceeds a specified value level 2 greater than the specified value level 1, and instructs shifting of a process which has been performed by the disk drive to the spare disk drive, a mirror section which performs mirroring between the disk drive and the spare disk drive, and a blockade/shift section which performs blockade of the disk drive and the shifting.

The array-type disk apparatus monitors a status of error occurrence in each of the disk drives and instructs initiation of mirroring between that disk drive and the spare disk drive when a number of errors occurred of the disk drive exceeds a specified value, clears mirroring of the spare disk drive when a number of errors occurred of that disk drive which is not undergoing mirroring exceeds the number of errors occurred of the disk drive that is undergoing mirroring, instructs initiation of mirroring between the disk drive not undergoing mirroring and the mirroring-cleared spare disk drive, and performs mirroring between the disk drive and the spare disk drive.

Further, the array-type disk apparatus has an error monitor section which monitors a status of error occurrence in each of the disk drives and gives such an instruction as to set the status of the disk drive in a temporary blocked state, and a data restoring section which, when a disk drive constituting a disk array group becomes the temporary blocked state, restores data of the temporary blocked disk drive from another disk drive constituting the disk array group to the spare disk drive, and performs reading from the temporary blocked disk drive when reading from the another disk drive constituting the disk array group is not possible during data restoration.

Furthermore, an array-type disk apparatus having a plurality of disk drives is designed in such a way that at the time of data shifting between disk drives, a number of read errors occurred from a data-shifting disk drive is stored, data from the data-shifting disk drive is read into a shifting-destination disk drives until the number of errors occurred reaches a specified value, data reading is switched to data reading from a disk drive constituting a disk array group when the number of errors occurred reaches the specified value, and data reading from the data-shifting disk drive is executed when data reading from the disk drive constituting the disk array group is in error and data restoration is not possible.

The array-type disk apparatus monitors a status of error occurrence in each of the disk drives with a disk array group constituted by the disk drives as one unit, instructs initiation of shifting of data of that disk drive whose number of errors occurred exceeds a specified value to the spare disk drive, dynamically changes the specified value to a smaller value when the numbers of errors occurred of the plurality of disk drives of the disk array group reach a sub specified value set smaller than the specified value, and performs data copying upon reception of that shifting instruction.

The present invention can suppress the occurrence of a 2 disk drives failure in which some of the disk drives constituting a disk array (RAID) group fail at a time.

The invention has an advantage such that because the array-type disk apparatus which copies data or so to a spare disk drive for a possible failure can perform mirroring to the spare disk drive and use the spare disk drive as a spare for that disk drive which has not undergone mirroring, the probability of occurrence of a 2 disk drives failure can be reduced without involving a cost increase for spare disk drives.

The invention has another advantage such that the array-type disk apparatus which copies data or so to a spare disk drive for a possible failure can execute spontaneous switching to the spare disk drive when the number of errors occurred reaches a specified value of the second level by performing mirroring to that disk drive which has a large number of errors occurred therein from the time at which the number of errors occurred is small and dynamically changing that disk drive which is to undergo mirroring in accordance with the number of errors occurred.

The invention has a further advantage such that the probability of occurrence of a 2 disk drives failure can be reduced in a disk array system in which one of disk drives constituting a disk array (RAID) group fails.

The invention has a still further advantage such that the probability of occurrence of a 2 disk drives failure can be reduced in an array-type disk apparatus which copies data or so to a spare disk drive for a possible failure in a state where the failure potential of plural disk drives constituting the array-type disk apparatus is high.

Furthermore, the invention has an advantage such that at the time of shifting data among disk drives in a large-capacity array-type disk apparatus, the hybrid system of a data restoring system based on redundant data and system of reading from a data-shifting disk drive can shift data to the data-shifting disk drive method without losing it by keeping using the data-shifting disk drive without being completely isolated.

BRIEF DESCRIPTION OF THE DRAWINGS

FIG. 5 is an explanatory diagram of a disk drive management table according to a second embodiment of the invention;

FIG. 6-1 is a flowchart of a dynamic mirroring operation according to the second embodiment of the invention;

FIG. 6-2 is a flowchart of the dynamic mirroring operation according to the second embodiment of the invention;

DESCRIPTION OF THE PREFERRED EMBODIMENTS

First Embodiment

The first embodiment of the invention is designed to achieve the first object of the invention.

That is, the first embodiment aims at providing highly reliable storage system, that is, a highly reliable array-type disk apparatus which copies data or so to a spare disk drive for a possible failure and reduces the probability of occurrence of a 2 disk drives failure without involving a cost increase for spare disk drives.

(1) Description of Structure

Figure 1:
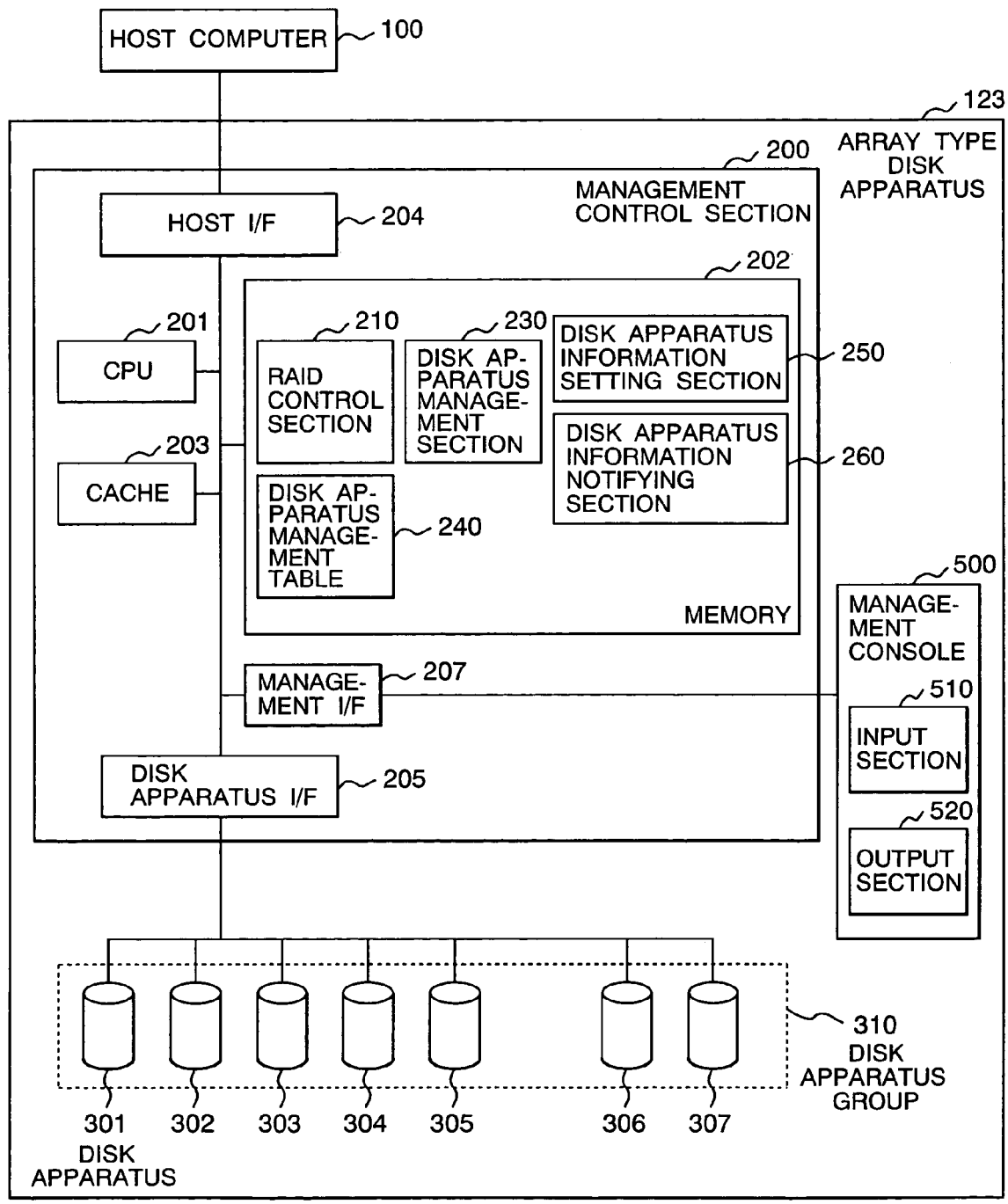
FIG. 1 is a structural diagram of an array-type disk apparatus according to a first embodiment of the invention.

The system structure of the first embodiment of the invention is discussed below referring to FIGS. 1 to 3. In FIG. 1, "100" denotes a host computer, "123" denotes an array-type disk apparatus, "200" denotes the management control section of the array-type disk apparatus, "310" denotes a group of disk drives and "500" denotes a management console.

The array-type disk apparatus 123, the host computer 100, the management control section 200, the disk drive group 310 and the management console 500 are connected to one another in the illustrated manner.

The array-type disk apparatus 123 includes the following components as the management control section 200. The management control section 200 includes a CPU 201 which controls the management control section 200, a memory 202, a cache 203 which buffers data of a user, a host interface (I/F) 204 which executes data transmission and reception with respect to the host computer 100, a disk drive I/F 205 which executes data transmission and reception with respect to the disk drive group 310, and a management I/F 207 which executes transmission and reception of control with respect to the management console 500. Those components are connected to one another as illustrated. The memory 202 has a RAID control section 210 which controls the disk array, a disk drive management section 230 which manages the disk drive group 310, a disk drive management table 240 which records disk drive information such as the operational parameters and operation statuses of the disk drive group 310, a disk drive information setting section 250 which sets disk drive information upon reception of an input from the management console 500, and a disk drive information notifying section 260 notifies disk drive information as an output to the management console 500.

The disk drive group 310 comprises disk drives 301 to 307. The disk drives 301 to 305 constitutes a disk array group which has the performance and reliability enhanced by the parallel operation and redundancy of disks that have been discussed in the foregoing description of the embodiment and this state is said to be constructing a disk array group to be a RAID group with the set of the disk drives 301 to 305. The disk drives 306 and 307 are spare disk drives that are placed in the disk array group in place of those disk drives constituting the disk array (RAID) group which fail.

The management console 500 comprises an input section 510 which inputs user's settings to the disk drives 301 to 305 and an output section 520 which informs the user of the information of the disk drives 301 to 305. Disk drive operation parameters to the disk drive management table 240 are input from the input section 510. The output section 520 outputs and displays the disk drive operational statuses of the disk drive management table 240.

Figures 2, 3:
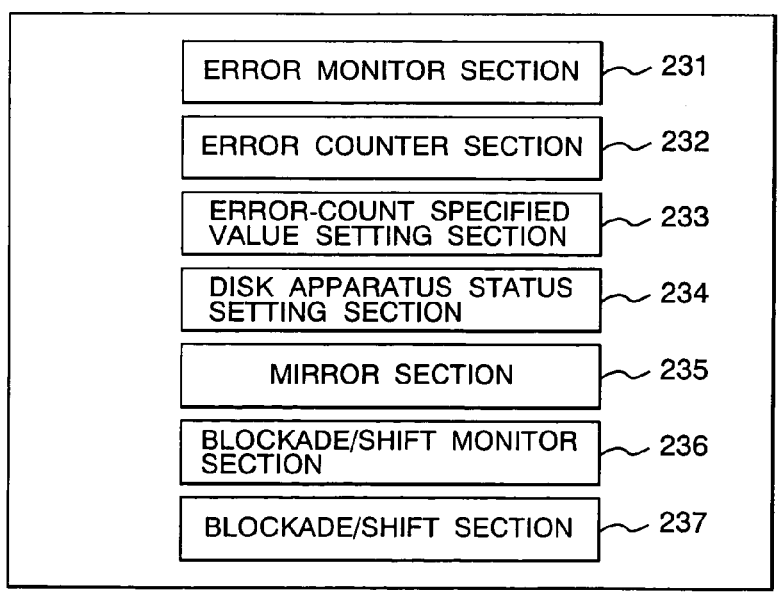
FIG. 2 is an explanatory diagram of a disk drive management table according to the first embodiment of the invention.
FIG. 3 is an explanatory diagram of disk drive management means according to the first embodiment of the invention.

FIG. 2 shows the disk drive management table 240. The parameters include "disk drive No." which represents the identification (ID) number of each disk drive, "error counter" which stores the accumulated number of errors of a disk drive, "error count specified value level 1" indicating the value of the first level as the index for the accumulated number of errors of a disk drive, "error count specified value level 2" indicating the value of the second level as the index for the accumulated number of errors of a disk drive, "spare bit" indicating usage as a spare disk drive, "disk drive status" indicating the operational status of a disk drive, and "pair disk drive" indicating the association with a spare disk drive which is used to cope with a disk drive failure.

Set in the "error count specified value level 1" is a value indicating the timing to start mirroring with the spare disk drive when the number of errors of a target disk drive is accumulated and it becomes very likely to cause a failure. Set in the "error count specified value level 2" is a value which is higher than the value of the "error count specified value level 1", a value indicating the timing to block the disk drive and end mirroring with the spare disk drive as a value for determining that the number of errors of a target disk drive is accumulated and the continuous operation does not seems possible. "YES" is set in the "spare bit" when the disk drive in question is the spare disk drive and "NO" is set otherwise. The "error count specified value level 1", "error count specified value level 2" and "spare bit" are set by the user using the input section 510 of the management console 500.

Set in the "disk drive status" are a parameter "normal" indicating that the operational status of a disk drive is not abnormal, a parameter "mirror" indicating that mirroring with the spare disk drive is being done, and a parameter "blocked" indicating that the value of the error counter has reached the "error count specified value level 2" and the continuous operation of the disk drive does not seem possible. The "disk drive No." of the disk drive which becomes a pair in mirroring is set in the "pair disk drive". The individual parameter values of the disk drive management table 240 are output and displayed on the output section 520 of the management console 500 in response to an instruction from the user.

FIG. 3 shows the disk drive management section 230. An error monitor section 231 monitors the status of occurrence of errors of a disk drive, instructs initiation of mirroring of the disk drive with the spare disk drive when the number of errors occurred of the disk drive exceeds the "error count specified value level 1", and instructs termination of mirroring when the number of errors exceeds the "error count specified value level 2". An error counter section 232 counts the number of errors occurred of the disk drive and sets the counted number of errors occurred to the "error counter" in the disk drive management table 240. An error-count specified value setting section 233 sets a parameter, designated by the user using the management console 500, to the disk drive management table 240. A disk drive status setting section 234 sets the operational status of a disk drive to the disk drive management table 240 in response to an instruction from the error monitor section 231. A mirror section 235 performs mirroring of an access from one disk drive to the spare disk drive. A blockade/shift monitor section 236 instructs blockade of a disk drive and shifting of the process which is being performed by the disk drive to the spare disk drive. A blockade/shift section 237 performs blockade and shifting of a disk drive in response to an instruction from the blockade/shift monitor section 236.

The above has discussed the system structure of the array-type disk apparatus according to the embodiment.

(2) Preventive Spare Copying Operation

The prior art drive monitors the number of errors occurred of a disk drive, copies data of that disk drive to a spare disk drive when the number of errors reaches a certain specified value and blocks the disk drive, whereas the first embodiment has two levels of specified values and starts mirroring with the spare disk drive when the number of errors occurred reaches the first specified value level 1. At this time, the disk drive is not blocked but kept operating. When the number of errors occurred reaches the second specified value level 2, mirroring is cleared, the disk drive is blocked and the operation continues with the spare disk drive.

Figure 4:
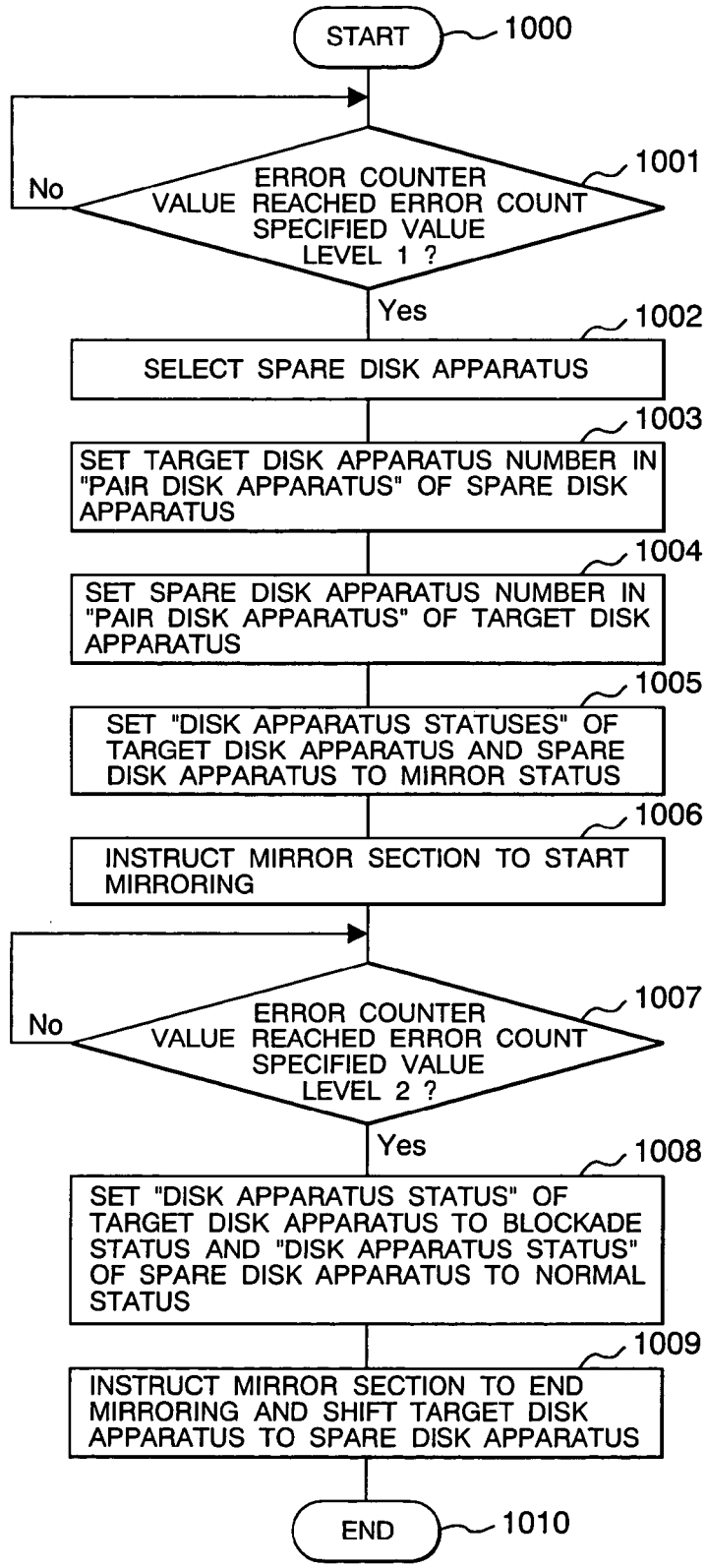
FIG. 4 is a flowchart of a preventive spare copying operation according to the first embodiment of the invention.

The preventing spare copying operation is discussed below using a flowchart in FIG. 4.

It is premised on that the error occurrence statuses of the individual disk drives 301 to 307 are counted by the error counter section 232 and are continuously set in the disk drive management table 240. The flowchart in FIG. 4 should be executed independently for the disk drives 301 to 305 constituting the disk array (RAID) group.

First, the error monitor section 231 determines whether or not the value of the "error counter" in the disk drive management table 240 of that disk drive which is to be monitored (hereinafter also referred to as "target disk drive") has reached the "error count specified value level 1" (step 1001). When the former value has not reached the error count specified value level 1, step 1001 is repeated. When the former value has reached the error count specified value level 1, a disk drive whose "spare bit" is YES is searched for and a spare disk drive is selected (step 1002). Thereafter, the error monitor section 231 sets the disk drive number of the target disk drive in the "pair disk drive" of the selected spare disk drive (step 1003), and sets the number of the spare disk drive into the "pair disk drive" of the target disk drive (step 1004). Next, the error monitor section 231 sets the "disk drive status" of the target disk drive and the spare disk drive in the mirror status (step 1005), and instructs the mirror section 235 to start mirroring of the target disk drive and the spare disk drive (step 1006).

FIG. 2 shows an example of the settings in the disk drive management table 240. In the disk array in which the disk array (RAID) group is comprised of disk drives having "disk drive Nos." 0 to 4, the disk drive with the "disk drive No." 4 has an "error counter" value of 60 exceeding the value "50" which is the "error count specified value level 1". This is the state where mirroring with the disk drive with the "disk drive No." 5 or a spare disk drive has already started, the "disk drive status" of the disk drive with the "disk drive No." 4 is "mirror" and its "pair disk drive" is the disk drive with the "disk drive No." 5, while the "disk drive status" of the disk drive with the "disk drive No." 5 is "mirror" and its "pair disk drive" is the disk drive with the "disk drive No." 4.

Returning to FIG. 4, in the next step, the error monitor section 231 determines whether or not the value of the "error counter" in the disk drive management table 240 of the target disk drive has reached the "error count specified value level 2" (step 1007). When the former value has not reached the error count specified value level 2, step 1007 is repeated. When the former value has reached the error count specified value level 2, the blockade/shift monitor section 236 instructs initiation of blockade and initiation of shifting to the spare disk drive, and sets the "disk drive status" of the target disk drive to the blocked status and the "disk drive status" of the spare disk drive to the normal status (step 1008), then instructs the mirror section 235 to terminate mirroring of the target disk drive and the spare disk drive and shifts the process which has been executed by the target disk drive to the spare disk drive (step 1009). The blockade and shifting are carried out by the blockade/shift section 237. To check from which disk the shifting to the spare disk is done, the value of the "pair disk drive" should be referred to.

The above has explained the preventing spare copying operation.

(3) Advantages

The prior art drive monitors the number of errors occurred of a disk drive, copies data of that disk drive to a spare disk drive when the number of errors reaches a certain specified value and blocks the disk drive, whereas the first embodiment has two levels of specified values and starts mirroring with the spare disk drive when the number of errors occurred reaches the first specified value level. At this time, the disk drive is not blocked but kept operating. When the number of errors occurred reaches the second specified value level, mirroring is cleared, the disk drive is blocked and the operation continues with the spare disk drive.

Because the target disk drive and the spare disk drive merely undergo mirroring, if a disk drive other than the target disk drive has an error occurrence status exceeding the second specified value level, it is possible to clear mirroring of this target disk drive and use the spare disk drive as a spare for another disk drive.

It is assumed that as shown in the example of the settings in the disk drive management table 240 in FIG. 2, for example, the disk drive with the "disk drive No." 4 has an "error counter" value of 60 exceeding the value "50" which is the "error count specified value level 1" and the disk drive with the "disk drive No." 4 and the disk drive with the "disk drive No." 5 are subjected to mirroring. In this state, in case where the value of the "error counter" of the disk drive with the "disk drive No." 0 exceeds the value of "90" which is the "error count specified value level 2", the error monitor section 231 can clear mirroring with the disk drives with the "disk drive Nos." 4 and 5 and can use the disk drive with the "disk drive No." 5 as a spare for the disk drive with the "disk drive No." 0. As the frequency of occurrence of errors of the disk drive with the "disk drive No." 0 becomes higher so that the disk drive is likely to fail, data is copied to the spare disk drive before the disk drive actually fails.

Because a spare disk drive can be used as a spare for another disk drive, the first specified value level can be set lower than the value specified in the prior art and the resistance to the 2 disk drives failure can be improved. As the spare disk drive can be used for different disk drives, the cost for the spare disk drives can be suppressed as compared with the prior art which blocks the target disk drive in the first level.

As mirroring is performed in the first level, it is possible to spontaneously switch to the spare disk drive when the number of errors reaches the second specified value level.

In short, the first embodiment can provide a highly reliable array-type disk apparatus which copies data or so to a spare disk drive for a possible failure and reduces the probability of occurrence of a 2 disk drives failure without involving a cost increase for spare disk drives.

Second Embodiment

The second embodiment, like the first embodiment, is designed to achieve the first object of the invention. That is, the second embodiment aims at providing highly reliable storage system, that is, a highly reliable array-type disk apparatus which copies data or so to a spare disk drive for a possible failure and reduces the probability of occurrence of a 2 disk drives failure without involving a cost increase for spare disk drives.

(1) Description of Structure

The system structure of the second embodiment of the invention is discussed below. For the sake of descriptive simplicity, only the differences from the first embodiment are discussed below. The system structure is the same as that of the first embodiment as shown in FIG. 1.

The disk drive group 310 comprises disk drives 301 to 307. The disk drives 301 to 305 constitutes a disk array whose performance and reliability are enhanced by the parallel operation and redundancy of disks that have been discussed in the foregoing description of the embodiment and this state is said to be constructing a disk array group to be a RAID group with the set of the disk drives 301 to 305. The disk drives 306 and 307 are spare disk drives that are placed in the disk array (RAID) group in place of those disk drives constituting the disk array (RAID) group which fail. The second embodiment differs from the first embodiment in that mirroring is performed on that disk drive which has a large number of errors occurred from a point of time at which the number of errors occurred was small. While it is desirable that all the spare disk drives or two or more spare disk drives should be subjected to mirroring, a single spare disk drive will do. In case where the number of errors occurred in a disk drive other than those disk drives which are being mirrored exceeds the numbers of errors occurred in the mirroring disk drives, mirroring of that mirroring disk drive which has the smallest number of errors occurred is cleared and the mirroring-cleared disk drive is used as a spare disk drive for mirroring of the disk drive whose number of errors occurred becomes large. As a disk drive to be mirrored is dynamically switched, this operation is called "dynamic mirroring operation".

FIG. 5 shows the disk drive management table 240 of the second embodiment, and the parameters are the same as those of the first embodiment shown in FIG. 2. The second embodiment differs from the first embodiment in that set in the "error count specified value level 1" is a value indicating the timing to check the "error counters" of all the disk drives and start mirroring of the spare disk drive and that disk drive which has a higher "error counter" when the number of errors occurred in a target disk drive is accumulated and the probability of occurrence of a 2 disk drives failure of the disk drive becomes high.

Set in the "disk drive status" are a parameter "normal" indicating that the operational status of a disk drive is not abnormal, a parameter "mirror" indicating that mirroring with the spare disk drive is underway, and a parameter "blocked" indicating that the value of the error counter has reached the "error count specified value level 2" and the continuous operation of the disk drive does not seem possible.

In the-second embodiment, the disk drive management section 230 is as illustrated in FIG. 3, and the error monitor section 231 monitors the status of occurrence of errors of a disk drive, and checks the "error counters" of all the disk drives and starts mirroring of the spare disk drive and that disk drive which has a higher "error counter" when the number of errors occurred in a target disk drive exceeds the "error count specified value level 1", and instructs termination of mirroring when the number of errors occurred exceeds the "error count specified value level 2".

The above is the description of the system structure of the embodiment.

(2) Dynamic Mirroring Operation

The prior art drive monitors the number of errors occurred of a disk drive, copies (mirrors) data of that disk drive to a spare disk drive when the number of errors reaches a certain specified value and blocks the disk drive, whereas the second embodiment performs mirroring on that disk drive which has a large number of errors occurred from a point of time at which the number of errors occurred was small, and dynamically switches a disk drive to be mirrored in accordance with the number of errors occurred.

Figures 1, 6:
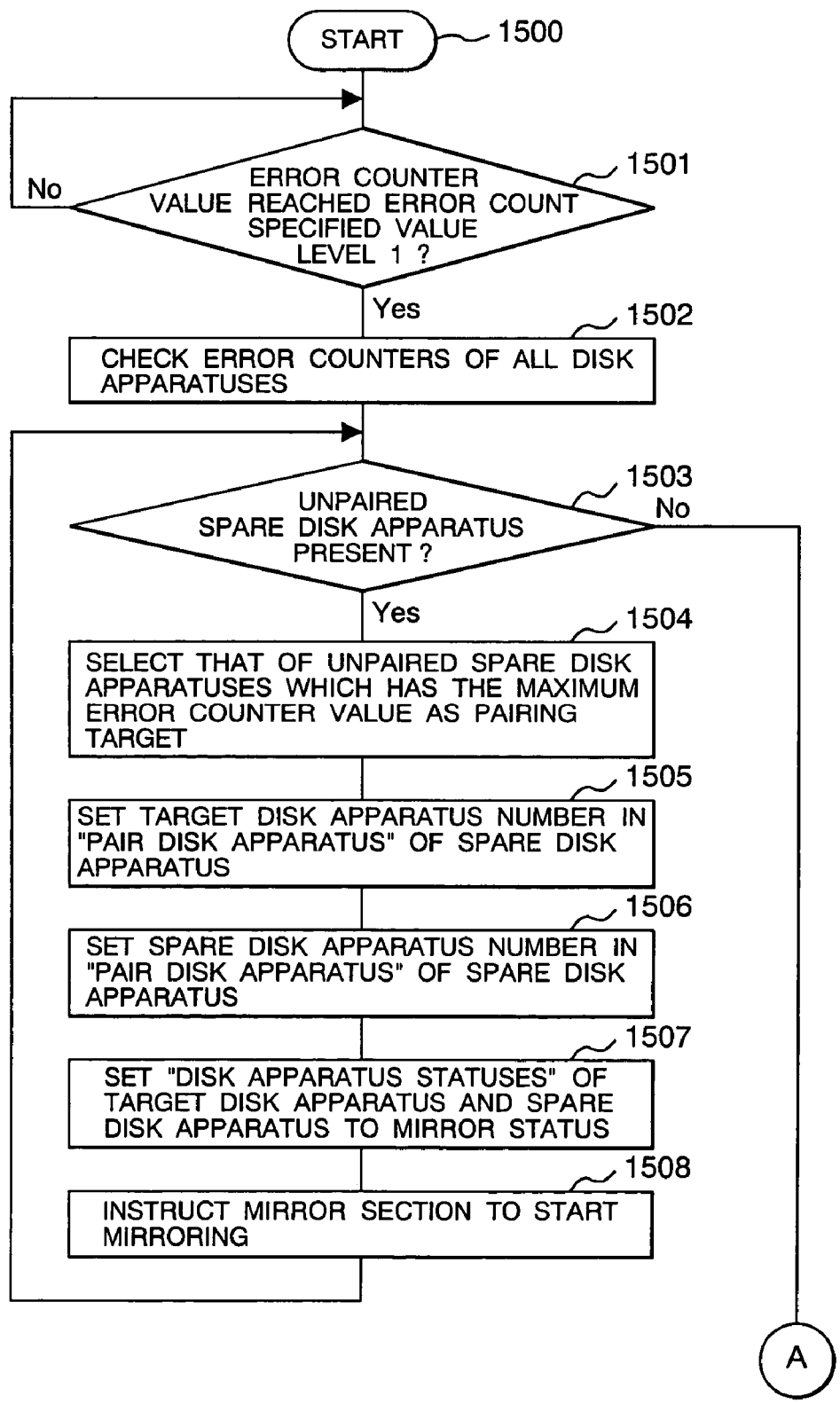
Figures 2, 6:
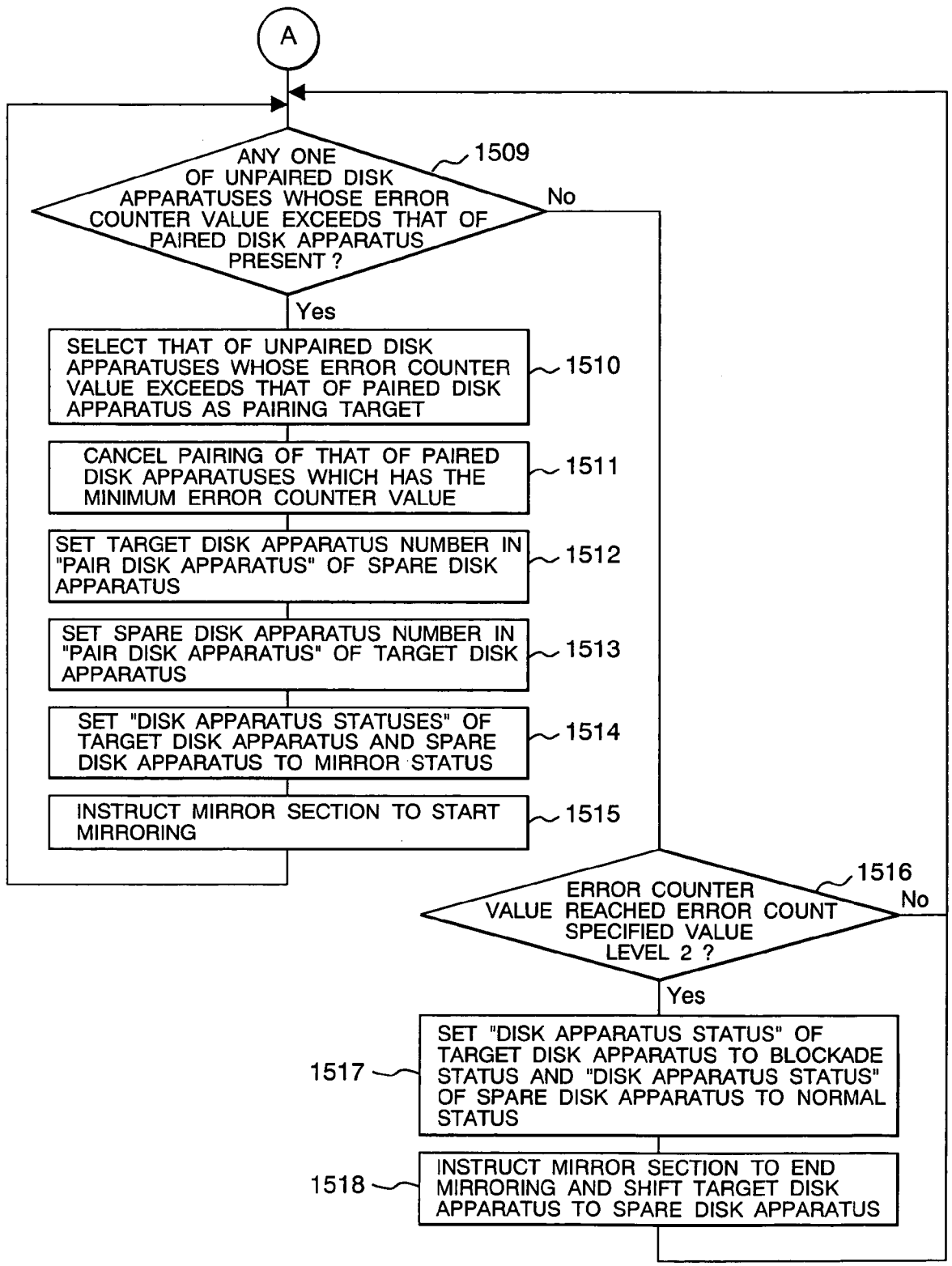

The dynamic mirroring operation is described next using flowcharts in FIGS. 6-1 and 6-2. It is premised on that the error occurrence statuses of the individual disk drives 301 to 307 are counted by the error counter section 232 and are continuously set in the disk drive management table 240.

First, the error monitor section 231 determines whether or not there is a disk drive the value of whose "error counter" in the disk drive management table 240 has reached the "error count specified value level 1" (step 1501). In this case, it does not matter which disk drive has the "error counter" value that has reached the "error count specified value level 1". In case where there is no disk drive whose "error counter" value has reached the "error count specified value level 1", step 1501 is repeated.

In case where there is a disk drive whose "error counter" value has reached the "error count specified value level 1", the values of the "error counter" of all the disk drives are checked (step 1502). Next, the error monitor section 231 searches for a disk drive whose "spare bit" is "YES" and determines whether or not there is any disk drive whose "mirror status" is "mirror", i.e., an unpaired spare disk drive (step 1503).

When there is an unpaired spare disk drive, the error monitor section 231 selects that one of unpaired disk drives whose "error counter" value is the largest as a pairing target (step 1504), sets the number of the target disk drive in the "pair disk drive" of the selected spare disk drive (step 1505), sets the number of the spare disk drive into the "pair disk drive" of the target disk drive (step 1506), sets the "disk drive statuses" of the target disk drive and the spare disk drive in the mirror status (step 1507), instructs the mirror section 235 to start mirroring (step 1508), then returns to step 1503.

When there is no unpaired spare disk drive, the flow goes to step 1509.

FIG. 5 shows an example of the settings in the disk drive management table 240. In the disk array in which the RAID group is comprised of disk drives having "disk drive Nos." 0 to 4, the disk drive with the "disk drive No." 2 has an "error counter" value of 35 exceeding the value "30" which is the "error count specified value level 1". This is the state where the flow has already proceeded to step 1509 and mirroring of the disk drive with the "disk drive No." 5 or a spare disk drive and a disk drive with the "disk drive No." 2 has already started, the "disk drive status" of the disk drive with the "disk drive No." 2 is "mirror" and its "pair disk drive" is the disk drive with the "disk drive No." 5, while the "disk drive status" of the disk drive with the "disk drive No." 5 is "mirror" and its "pair disk drive" is the disk drive with the "disk drive No." 2. It is also the state where mirroring of the disk drive with the "disk drive No." 4 which has the second largest "error counter" value and a disk drive with the "disk drive No." 6 or a spare disk drive has already started, the "disk drive status" of the disk drive with the "disk drive No." 4 is "mirror" and its "pair disk drive" is the disk drive with the "disk drive No." 6, while the "disk drive status" of the disk drive with the "disk drive No." 6 is "mirror" and its "pair disk drive" is the disk drive with the "disk drive No." 4.

Returning to FIG. 6-2, as the next step 1509, the error monitor section 231 determines whether or not a disk drive whose "error counter" value exceeds that of the paired disk drive is included in unpaired disk drives (step 1509).

When there is such a disk drive, the error monitor section 231 selects that one of unpaired disk drives whose "error counter" value exceeds that of a paired disk drive as a pairing target (step 1510), clears pairing of that of the paired disk drives whose "error counter" value is the smallest (step 1511), sets the number of the target disk drive in the "pair disk drive" of the pairing-cleared spare disk drive (step 1512), sets the number of the spare disk drive into the "pair disk drive" of the target disk drive (step 1513), sets the "disk drive statuses" of the target disk drive and the spare disk drive in the mirror status (step 1514), instructs the mirror section 235 to start mirroring (step 1515), then returns to step 1509.

Steps 1509 to 1515 are explained below using an example of the settings in the disk drive management table 240 shown in FIG. 5. This diagram shows the state where mirroring of the disk drive with the "disk drive No." 5 which is a spare disk drive and the disk drive with the "disk drive No." 2 is carried out and mirroring of the disk drive with the "disk drive No." 6 which is a spare disk drive and the disk drive with the "disk drive No." 4 is carried out.

It is assumed that under the situation, the "error counter" value of the disk drive with the "disk drive No." 0 is 25 which exceeds that of any mirrored disk drive. In this case, the decision in step 1509 is YES, the next mirroring target is the disk drive with the "disk drive No." 0, pairing of the disk drive with the "disk drive No." 4 or that one of the mirrored disk drives whose "error counter" value is the smallest is cleared, and mirroring of the disk drive with the "disk drive No." 6 which is the pairing-cleared spare disk drive and the disk drive with the "disk drive No." 0 is executed.

Returning to FIG. 6-2, when a disk drive whose "error counter" value exceeds that of the paired disk drive is not included in the unpaired disk drives in step 1509, the error monitor section 231 determines whether or not the value of the "error counter" of the target disk drive has reached the "error count specified value level 2" (step 1516). When the former value has not reached the error count specified value level 2, the flow returns to step 1509. When the former value has reached the error count specified value level 2, the "disk drive status" of the target disk drive is set to the blocked status and the "disk drive status" of the spare disk drive is set to the normal status (step 1517), an instruction is sent to the mirror section 235 to terminate mirroring of the target disk drive and the spare disk drive and the process which has been executed by the target disk drive is shifted to the spare disk drive (step 1518), after which the flow returns to step 1509. To check from which disk the shifting to the spare disk is done, the value of the "pair disk drive" should be referred to.

The dynamic mirroring operation is performed as described above.

With the value of the "error count specified value level 1" set to 0, the dynamic mirroring operation starting at step 1502 may be executed from the beginning. The criterion for the decision in step 1509 may be the determination of whether or not a disk drive whose "error counter" value exceeds the maximum value of the "error counters" of the paired disk drives is included in unpaired disk drives. Alternatively, the step 1509 may determine whether or not a disk drive whose "error counter" value exceeds an intermediate value, an average value or so derived from the "error counter" values of the paired disk drives is included in unpaired disk drives.

(3) Advantages

The prior art drive monitors the number of errors occurred of a disk drive, copies data of that disk drive to a spare disk drive when the number of errors reaches a certain specified value and blocks the disk drive, whereas the second embodiment executes mirroring on that disk drive which has a large number of errors occurred from a point of time at which the number of errors occurred was small and dynamically switches the disk drive in accordance with the number of errors occurred. This increases the probability of instantaneously switching to a spare disk drive when the number of errors occurred reaches the second specified value level and thus improves the resistance to a 2 disk drives failure of disk drives.

Although the foregoing description has described that dynamic mirroring is performed with respect to a single disk array (RAID) group, dynamic mirroring may be performed with respect to the entire disk array (RAID) group in the array-type disk apparatus using all the spare disk drives in the array-type disk apparatus.

Third Embodiment

The third embodiment is designed to achieve the second object of the invention.

That is, the third embodiment aims at providing highly reliable storage system, that is, a highly reliable array-type disk apparatus which reduces the probability of occurrence of a 2 disk drives failure when one of the disk drives constituting a disk array (RAID) group has failed.

(1) Description of Structure

Figure 7:
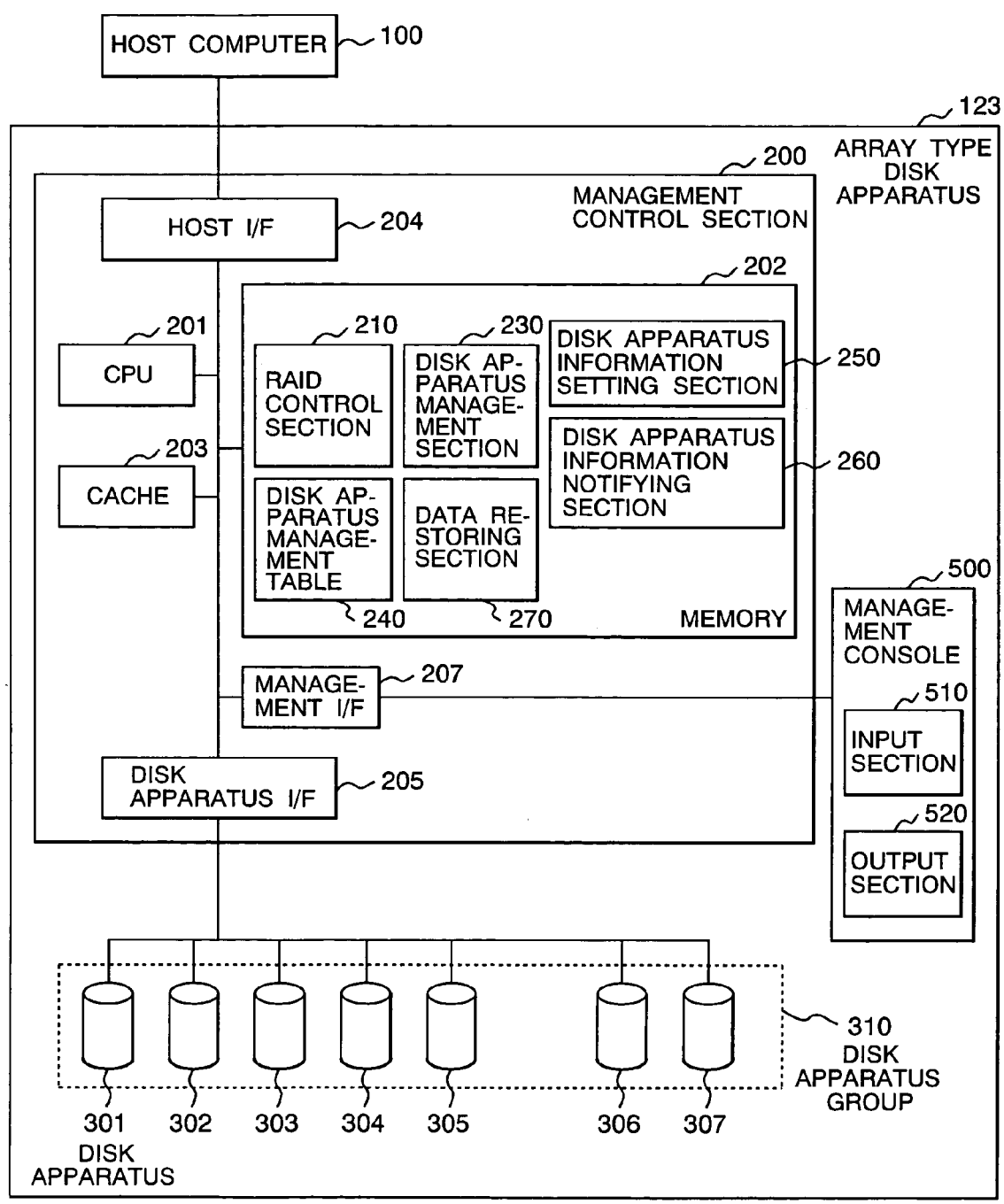
FIG. 7 is a structural diagram of an array-type disk apparatus according to a third embodiment of the invention.

The system structure of the third embodiment of the invention is discussed below using FIGS. 7 to 9. For the sake of descriptive simplicity, only the differences from the first embodiment are discussed below. In FIG. 7, a data restoring section 270 which, when a disk drive is blocked, restores data from another disk drive constituting a disk array (RAID) group to a spare disk drive is provided in the memory 202 in addition to the structure in FIG. 1.

Figures 8, 9:
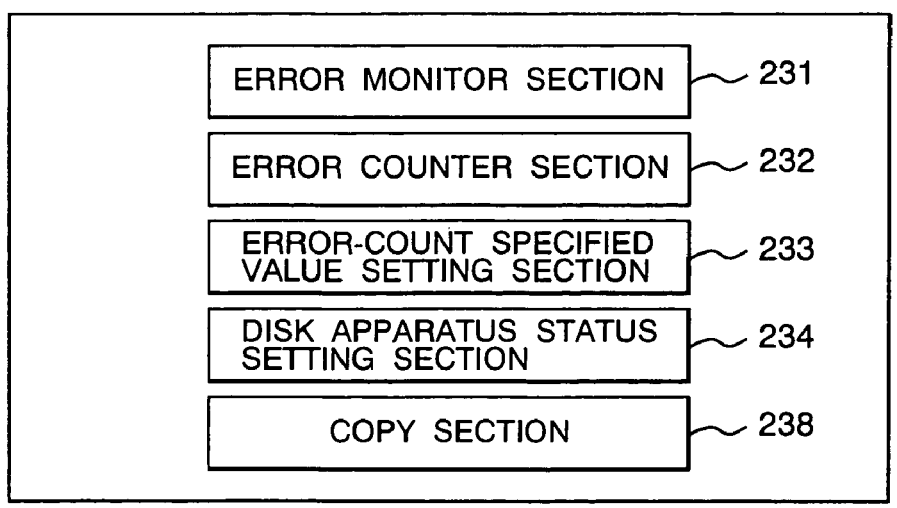
FIG. 8 is an explanatory diagram of a disk drive management table according to the third embodiment of the invention.
FIG. 9 is an explanatory diagram of a disk drive management section according to the third embodiment of the invention.

The parameters in the disk drive management table 240 in FIG. 8 are the parameters in FIG. 2 from which the error count specified value level 2 is omitted. The contents of the parameters in FIG. 8 differ from those in FIG. 2 in the following points.

Set in the "error count specified value level 1" is a value indicating the timing to start copying to the spare disk drive when the number of errors occurred in a target disk drive is accumulated and the possibility of occurrence of a failure becomes high. After copying ends, the processing of the target disk drive is shifted to the spare disk drive but reading from the target disk drive which is carried out by the data restoring section 270 is permitted.

Set in the "disk drive status" are a parameter "normal" indicating that the operational-status of a disk drive is not abnormal, a parameter "copy" indicating that the error counter value has reached the "error count specified value level 1" and copying to the spare disk drive is underway, a parameter "temporary blocked" indicating that copying to the spare disk drive has finished and reading from the target disk drive which is carried out by the data restoring section 270 is permitted, a parameter "blocked" indicating that copying is finished, and a parameter "restoring" indicating that a process of restoring data from another disk drive constituting the disk array (RAID) group to the spare disk drive is underway. A parameter "disk drive No." of a disk drive to be a pair to which copying is to be done is set in the "pair disk drive".

FIG. 9 shows the disk drive management section 230 according to the third embodiment and has a copy section 238 in place of the mirror section 235 in FIG. 3. The error monitor section 231 monitors the status of occurrence of errors of a disk drive, instructs initiation of copying to a spare disk drive from a target disk drive when the number of errors occurred in the target disk drive exceeds the "error count specified value level 1", sets the "temporary blocked" status during copying and sets the "blocked" status after copying is done. The copy section 238 copies data in one disk drive to a spare disk drive.

The above is the description of the system structure of the embodiment.

(2) Sector Failure Restoring Operation

This embodiment improves the data restoration capability in case of a 2 disk drives failure where with one sector becoming unreadable so that data is to be restored to a spare disk drive from another disk drive constituting the disk array (RAID) group, one sector in said another disk drive constituting the disk array (RAID) group further becomes unreadable. The disk drive one sector of which has become unreadable is set to the "temporary blocked" status where reading executed by the data restoring section 270 is permitted.

Figure 10:
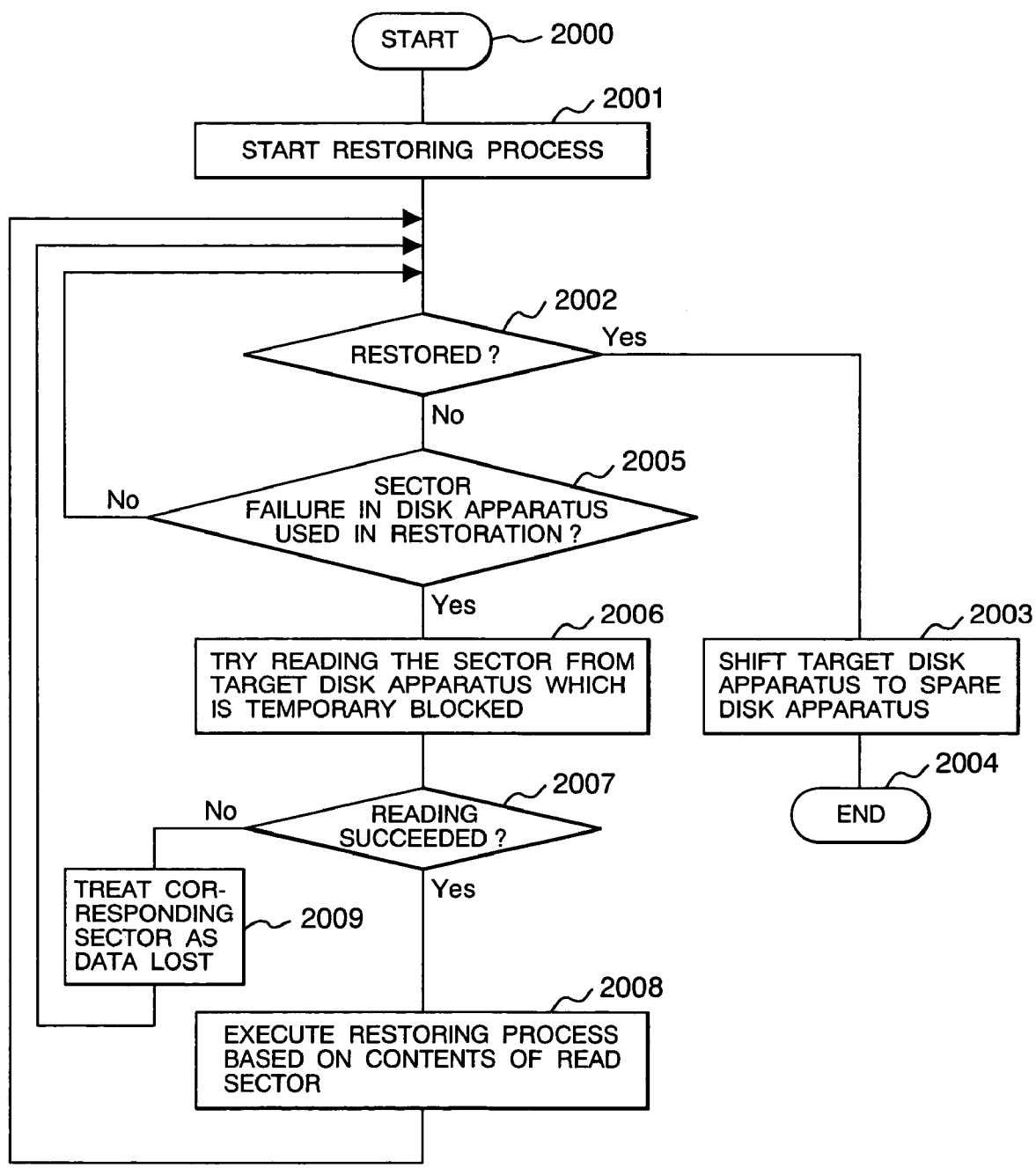
FIG. 10 is a flowchart of a sector failure restoring operation according to the third embodiment of the invention.

The sector failure restoring operation is discussed next using a flowchart in FIG. 10. It is premised on that the error occurrence statuses of the individual disk drives 301 to 307 are counted by the error counter section 232 and are continuously set in the disk drive management table 240. The flowchart in FIG. 10 should be executed independently for the disk drives 301 to. 305 constituting a disk array group. The disk drive with the "disk drive No." 4 constituting the disk array (RAID) group has its number of errors increasing and has one sector having become unreadable and is thus set to the "temporarily blocked" status regardless of the error counter. It is assumed that data is being restored to the spare disk drive with the "disk drive No." 5 using the disk drives with the "disk drive Nos." 0 to 3 and the redundancy of the disk array (RAID). It is further assumed that under the situation, one sector of the disk drive with the "disk drive No." 0 becomes unreadable so that data is read from the same sector in the disk drive with the "disk drive No." 4 to restore the disk array (RAID) group.

First, based on the data of the disk drive with the "disk drive Nos." 0 to 3, the data restoring section 270 starts a data restoring process, equivalent to a data restoring process to be done on the disk drive with the "disk drive No." 4, with respect to the spare disk drive with the "disk drive No." 5 (step 2001). Next, the data restoring section 270 determines whether or not restoration is finished (step 2002). When the restoration is finished, the data restoring section 270 shifts the processing of the disk drive with the "disk drive No." 4, which is the restoration target, to the spare disk drive (step 2003), then terminates the process (step 2004). When the restoration has not ended, the data restoring section 270 determines whether or not the disk drives with the "disk drive Nos." 0 to 3 have a sector failure which disables sector reading (step 2005). When there is no sector failure, step 2002 is repeated. When there is a sector failure, the data restoring section 270 attempts to read data from the same sector in the disk drive with the "disk drive No." 4 which is in the "temporary blocked" status (step 2006). The data restoring section 270 determines whether or not reading is successful (step 2007), and executes a restoring process based on the contents of the read sector (step 2008) and returns to step 2002 when reading is successful. When reading is failed, the corresponding sector is treated as data lost (step 2009) after which the flow returns to step 2002.

The sector failure restoring operation is performed as described above.

(3) Write Operation in Sector Failure Restoring Operation

Figure 11:
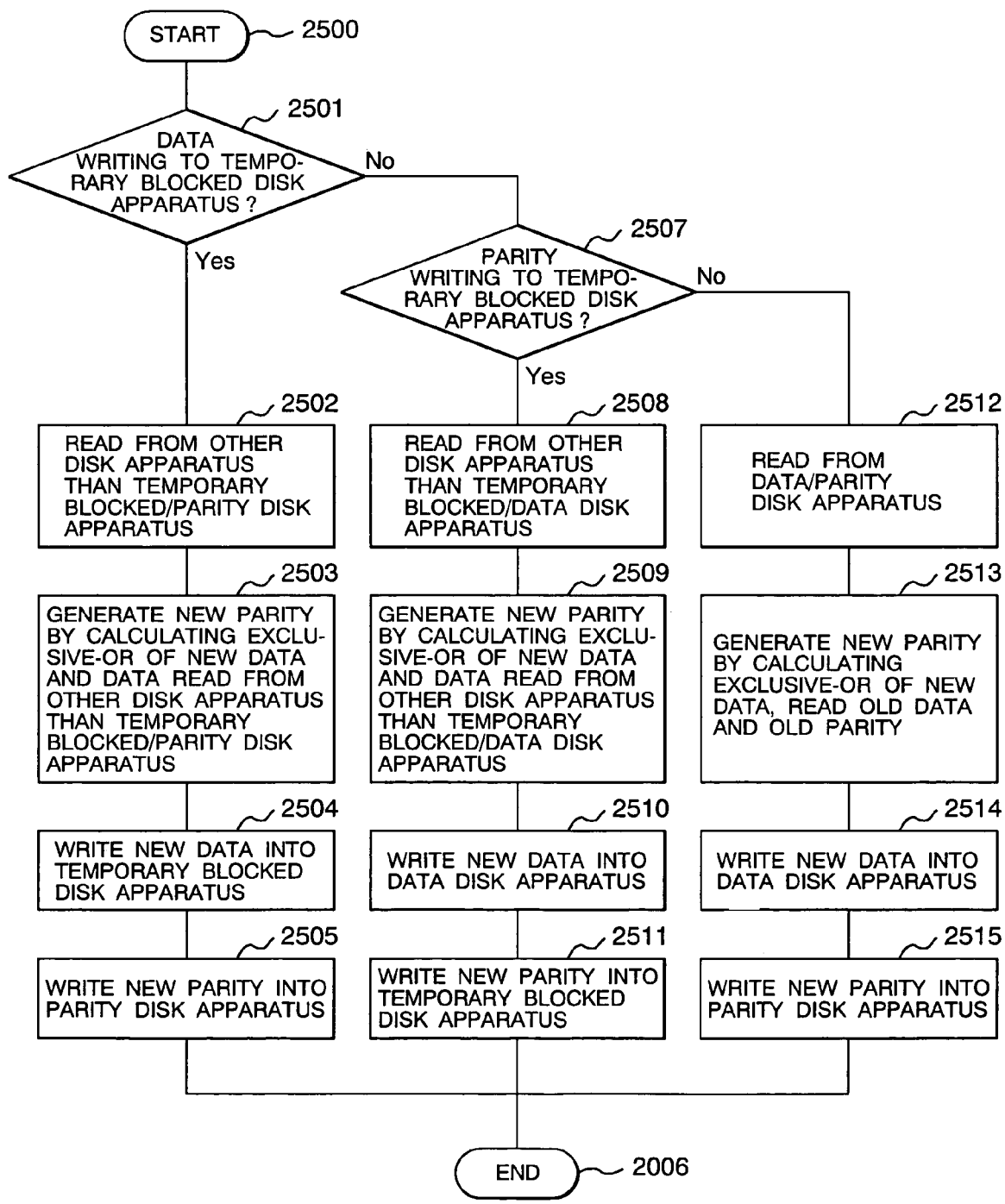
FIG. 11 is a flowchart of a write operation in the sector failure restoring operation according to the third embodiment of the invention.

Suppose, as the premise, that the error occurrence statuses of the individual disk drives 301 to 307 are counted by the error counter section 232 and are continuously set in the disk drive management table 240. It is assumed that the flowchart in FIG. 11 is performed on the entire disk array (RAID) group comprised of the disk drives 301 to 305. Further, the disk drives 301 to 305 constitutes the disk array (RAID) group, data and a parity are stored in each disk drive and a set of a parity and data for computing the parity is called "stripe set".

Referring to FIG. 11, when-the management control section 200 receives a write request from the host computer 100, the disk array (RAID) control section 210 determines whether or not a writing destination is a temporary blocked disk drive (step 2501).

When the writing destination is a temporary blocked disk drive, the processes starting at step 2502 take place. Suppose that the disk drive 305 is the temporary blocked disk drive and the disk drive 301 is the disk drive where the parity in the same stripe set as having the data to be written (or write data) is stored. First, the RAID control section 210 reads data in the same stripe set corresponding to the write data from the disk drives 302 to 304 other than the temporary blocked disk drive 305 and the disk drive 301 where the parity is stored (step 2502). Next, the exclusive-OR of the write data and the data read in step 2502 is computed, thus generating a new parity (step 2503). Then, the write data is written in the disk drive 305 or the temporary blocked disk drive (step 2504), and the new parity is stored in the parity-stored disk drive 301 (step 2505) after which the processing is terminated.

When the writing destination is not a temporary blocked disk drive, the processes starting at step 2507 take place. The RAID control section 210 determines whether or not the parity in the same stripe set as having the write data is located in the temporary blocked disk drive (step 2507).

When the parity is located in the temporary blocked disk drive, the processes starting at step 2508 take place. Suppose that the disk drive 305 is the temporary blocked disk drive and the disk drive 301 is the disk drive where write data is stored. First, the RAID control section 210 reads data in the same stripe set corresponding to the write data from the disk drives 302 to 304 other than the temporary blocked disk drive 305 and the disk drive 301 where data is stored (step 2508). Next, the exclusive-OR of the write data and the data in the same stripe set read in step 2508 is computed, thus generating a new parity (step 2509). Then, the write data is written in the disk drive 301 (step 2510), and the new parity is stored in the disk drive 305 which is the parity-stored disk drive where the parity is stored (step 2511) after which the processing is terminated.

When the parity is not located in the temporary blocked disk drive, the processes starting at step 2512 take place suppose that the disk drive 305 is the temporary blocked disk drive, the disk drive 301 is the disk drive where write data is stored, and the disk drive 302 is the disk drive where the parity in the same stripe set is stored. First, the RAID control section 210 reads old data from the disk drive 301 where write data before update is stored and reads an old parity from the disk drive where a parity before update is stored (step 2512). Next, the exclusive-OR of the write data, the old data and the old parity, the latter two read in step 2512, is computed, thus generating a new parity (step 2513). Then, the write data is written in the disk drive 301 (step 2514), and the new parity is stored in the disk drive 302 where the parity is stored (step 2515) after which the processing is terminated.

The above is the description of the write operation when a write request is issued from the host computer 100 during sector failure restoration.

As data can be restored by using the redundancy of the disk array (RAID), writing to a temporarily blocked disk drive in step 2504 and step 2511 may be omitted. Instead of writing to a temporarily blocked disk drive in step 2504 and step 2511, writing may be done to the spare disk drive to which spare copying is being performed. In addition to writing to a temporarily blocked disk drive in step 2504 and step 2511, the contents of the temporarily blocked disk drive may be written into the spare disk drive which is undergoing spare copying.

(4) Advantages

The third embodiment can improve the data restoration capability in case of a 2 disk drives failure where with one sector becoming unreadable so that data is to be restored to a spare disk drive from another disk drive constituting the disk array (RAID) group, one sector in said another disk drive constituting the disk array (RAID) group further becomes unreadable.

In short, the embodiment can provide a highly reliable array-type disk apparatus which reduces the probability of occurrence of a 2 disk drives failure when one of the disk drives constituting a disk array (RAID) group has failed.

Although the foregoing description has been given on the premise that preventive copying is performed on a spare disk drive, this embodiment can be adapted to an array-type disk apparatus which does not perform preventive copying.

Although restoration in an array-type disk apparatus in the foregoing description is initiated on the premise that one sector of a disk drive becomes unreadable, other conditions may be employed. For example, restoration of a disk drive may be initiated when that disk drive is considered as being in a blocked status as the number of errors occurred in the disk drive has exceeded the specified value.

Fourth Embodiment

The fourth embodiment is designed to achieve the third object of the invention.

That is, the fourth embodiment aims at providing highly reliable storage system, that is, a highly reliable array-type disk apparatus which copies data or so to a spare disk drive for a possible failure and reduces the probability of occurrence of 2 disk drives failure when a failure potential of plural disk drives constituting a disk array (RAID) group is high.

(1) Description of Structure

The system structure of the fourth embodiment of the invention is discussed below using FIGS. 12 and 13. For the sake of descriptive simplicity, only the differences from the first embodiment are discussed below. The structure of this array-type disk apparatus is the same as that of the second embodiment in FIG. 7, except that the data restoring section 270 need not have a function of reading a sector associated with a sector failure when the failure occurs during data restoration.

Figures 12, 13:
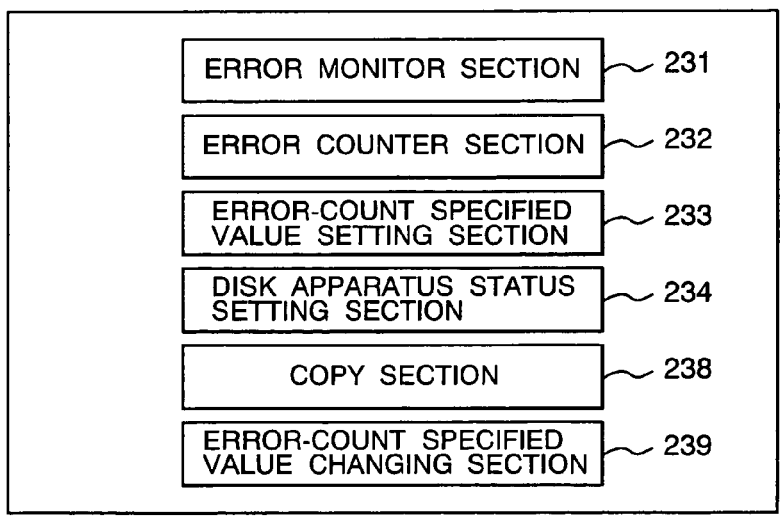
FIG. 12 is an explanatory diagram of a disk drive management table according to a fourth embodiment of the invention.
FIG. 13 is an explanatory diagram of disk drive management means according to the fourth embodiment of the invention.

The parameters in the disk drive management table 240 in FIG. 12 are the parameters in FIG. 8 to which an error count sub specified value is added. The contents of the parameters in FIG. 12 differ from those in FIG. 8 in the following points.

Set in the "error count specified value level 1" is a value indicating the timing to start copying to the spare disk drive when the number of errors occurred in a target disk drive is accumulated and the possibility of occurrence of a failure becomes high. After copying ends, the processing of the target disk drive is shifted to the spare disk drive and the target disk drive is set to a blocked status. The "error count sub specified value" is set to a value lower than the "error count specified value level 1" and when the numbers of errors occurred in plural disk drives in those disk drives constituting a disk array (RAID) group reach the error count sub specified value, it means that those disk drives are potentially very likely to fail at the same time.

Set in the "disk drive status" are a parameter "normal" indicating that the operational status of a disk drive is not abnormal, a parameter "copy" indicating that the error counter value has reached the "error count specified value level 1" and copying to the spare disk drive is underway, a parameter "blocked" indicating that copying to a spare disk drive is finished, and a parameter "restoring" indicating that a process of restoring data from another disk drive constituting the disk array (RAID) group to the spare disk drive is underway.

FIG. 13 shows the disk drive management section 230 according to the fourth embodiment and has a copy section 238 in place of the mirror section 235 in FIG. 3. The error monitor section 231 monitors the status of occurrence of errors of a disk drive, instructs initiation of copying to a spare disk drive from a target disk drive when the number of errors occurred in the target disk drive exceeds the "error count specified value level 1", and sets the "blocked" status after copying is done. A blockade/shift section 237 re-sets the value of the "error count specified value level 1".

The above is the description of the system structure of the embodiment.

(2) 2 Disk Drives Failure Preventing Operation

This embodiment reduces the probability of occurrence of 2 disk drives failure by dynamically changing the error count specified value which triggers initiation of preventive copying to a spare disk drive in a state where a failure potential of plural disk drives constituting the disk array (RAID) group is high.

Figure 14:
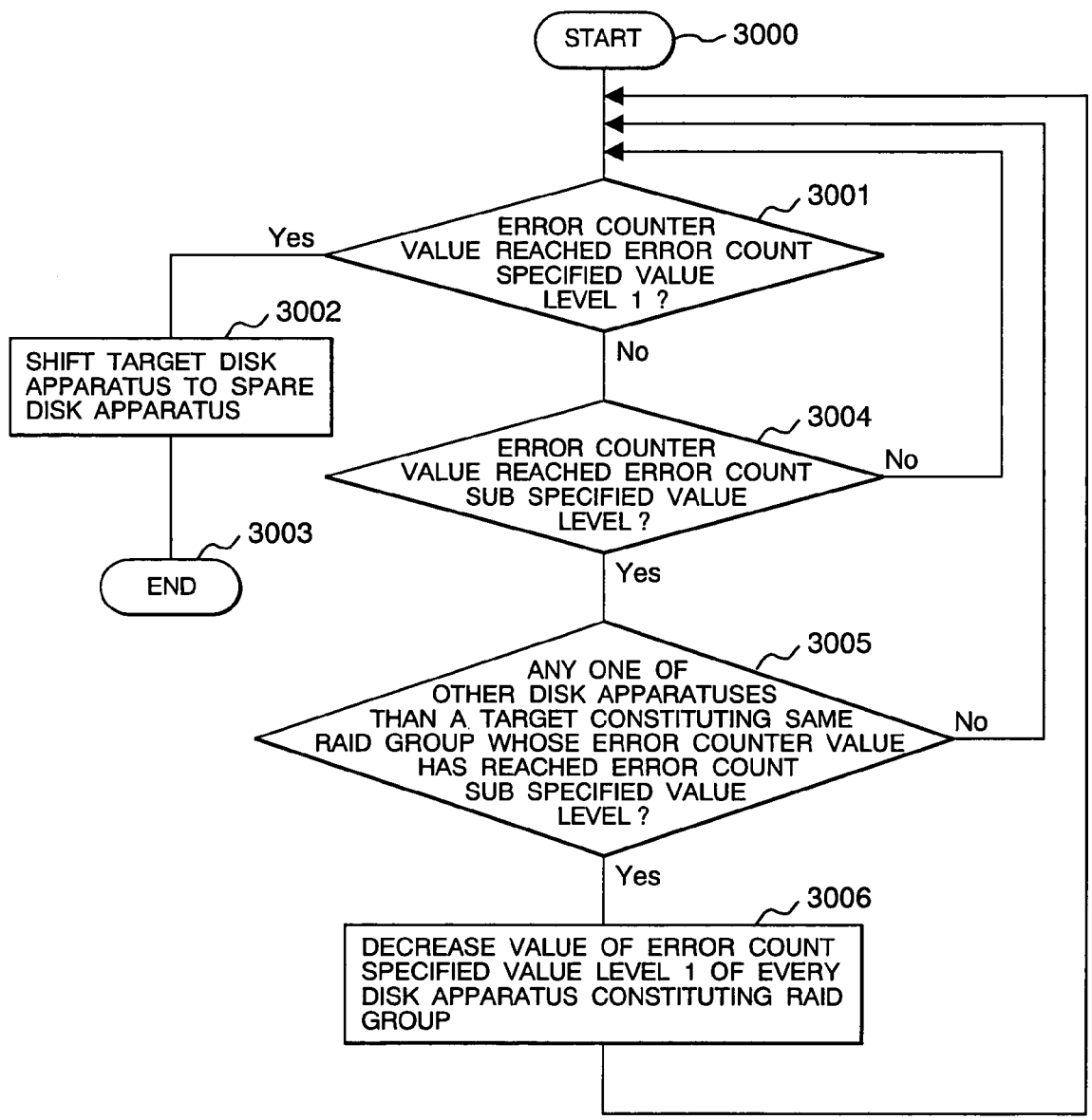
FIG. 14 is a flowchart of a 2 disk drives failure preventing operation according to the fourth embodiment of the invention.

The 2 disk drives failure preventing operation is discussed next using a flowchart in FIG. 14.

It is premised on that the error occurrence statuses of the individual disk drives 301 to 307 are counted by the error counter section 232 and are continuously set in the disk drive management table 240. The flowchart in FIG. 11 should be executed independently for the disk drives 301 to 305 constituting a disk array group. It is assumed that the numbers of errors in the disk drives with the "disk drive Nos." 1 and 3 constituting the disk array (RAID) group are increasing and possible occurrence of a 2 disk drives failure in the disk drives is potentially high.

First, the error monitor section 231 determines whether or not the value of the "error counter" in the disk apparatus management table 240 of a disk apparatus to be monitored has reached the "error count specified value level 1" (step 3001). When the "error counter" value has reached the "error count specified value level 1", a process of copying the contents of the disk drive to the spare disk drive and shifting the processing is performed (step 3002). When the "error counter" value has not reached the "error count specified value level 1", it is determined whether or not the "error counter" value has reached the "error count sub specified value" (step 3004). When the "error counter" value has not reached the "error count sub specified value", step 3001 is repeated. When the "error counter" value has reached the "error count sub specified value", it is determined whether or not there is any of those disk drives, excluding the target disk drive, which constitute the disk array (RAID) group and whose error counter value has reached the "error count sub specified value" (step 3005). When there is no such a disk drive, step 3001 is repeated. When there is a disk drive whose error counter value has reached the "error count sub specified value", the values of the "error count specified value level 1" of all the disk drives constituting the disk array (RAID) group are decreased (step 3006) after which step 3001 is repeated.

The re-setting of the value of the "error count specified value level 1" is performed by the blockade/shift section 237. The value to be re-set can be any value, such as an intermediate value between the "error count specified value level 1" and the "error count sub specified value". Although the criterion for the decision in steps 3004 and 3005 is the determination of whether or not there is any of those disk drives, excluding the target disk drive, which constitute the disk array (RAID) group and whose error counter value has reached the "error count sub specified value", it may be the total value of the "error counter" values of all the disk drives constituting the disk array (RAID) group.

The 2 disk drives failure preventing operation is carried out as described above.

(3) Advantages

The fourth embodiment can provide a highly reliable array-type disk apparatus which copies data or so to a spare disk drive for a possible failure and reduces the probability of occurrence of 2 disk drives failure when a failure potential of plural disk drives constituting the disk array (RAID) group is high.

Note that the fourth embodiment dynamically changes the specified value which is the decision reference for the number of errors occurred and may be combined with the first to third embodiments taken singularly or in combination.

Further, adapting the data restoring section 270 of the third embodiment in the first and second embodiments can cope with a sector read failure in one disk drive during data restoration which is triggered by a disk drive failure.

Fifth Embodiment

The fifth embodiment is illustrated below. The fifth embodiment designed to achieve the fourth object of the invention.

Figure 15:
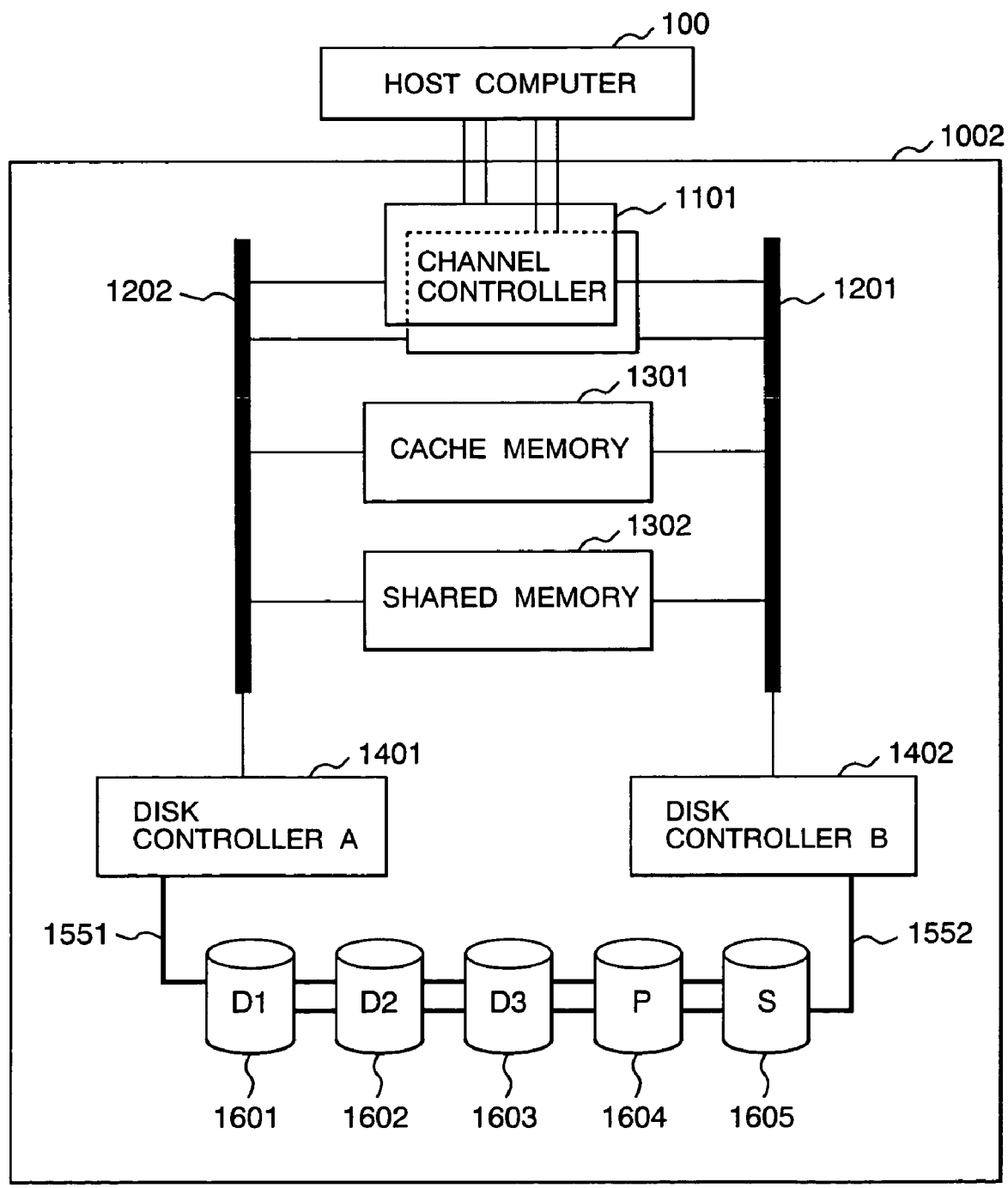
FIG. 15 is a diagram showing the drive structure according to a fifth embodiment of the invention.

FIG. 15 is an explanatory diagram showing the structure of storage system, that is, an array-type disk apparatus according to the fifth embodiment of the invention. The array-type disk apparatus of this embodiment comprises a single channel controller or plural channel controllers 1101 each of which has a plurality of host I/Fs for exchanging commands and data with the host computer 100, a cache memory 1301 which temporarily stores input/output data to or from the host computer 100, disk drives 1601 to 1605 to which store input/output data to or from the host computer 100, a single disk controller or plural disk controllers A (1401) each having a single or plural disk drive I/Fs 1551, a single disk controller or plural disk controllers B (1402) each likewise having a single or plural disk drive I/Fs 1552, a shared memory 1302 which can be accessed by both the disk controller A (1401) and disk controller B (1402), and system buses 1201 and 1202 for data transfer and communication among the channel controller 1101, the cache memory 1301, the shared memory 1302 and the disk controllers A (1401) and B (1402). The disk drives D1 (1601), D2 (1602), D3 (1603) and P (1604) have redundancy because of their disk array (RAID) structure.

The channel controller 1101 which has received write data from the host computer 100 saves the write data in the cache memory 1301 and instructs the disk controller A (1401) or the disk controller B (1402) to write the write data, located in the cache memory 1301, into the disk drives 1601 to 1604. The channel controller 1101 which has received a data read request from the host computer 100 instructs the disk controller A (1401) or the disk controller B (1402) to read data the disk drives 1601 to 1604 and transfer the data to the cache memory 1301. Having received the instruction, the disk controller A (1401) or the disk controller B (1402) reads data the disk drives 1601 to 1604, transfers the data to the cache memory 1301, then informs the channel controller 1101 of the end of data reading. The informed channel controller 1101 transfers the data from the cache memory 1301 to the host computer 100.

Figure 16:
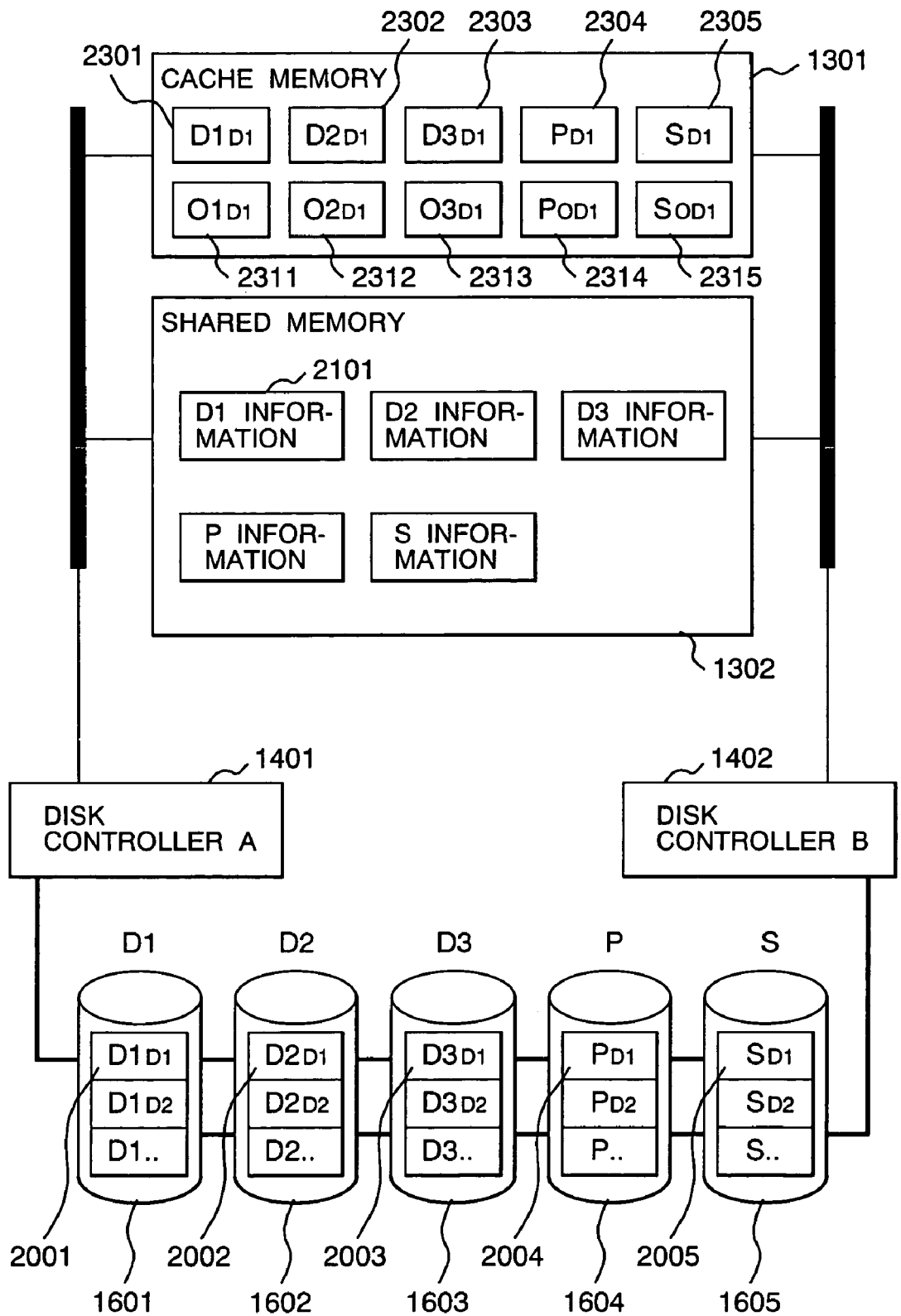
FIG. 16 is a diagram showing the details of the drive structure according to the fifth embodiment of the invention.

FIG. 16 is a diagram for explaining data restoration according to the invention, which prevents the occurrence of a 2 disk drives failure, in case where a read error has occurred.

The disk controller A (1401) or disk controller B (1402), which has detected a read error of data $D1_{D1}$ (2001) on the disk drive D1 (1601) updates disk drive information 2101 on the shared memory 1302, reads data $D2_{D1}$ (2002) in the disk drive D2 (1602), data $D3_{D1}$ (2003) in the disk drive D3 (1603), data $D3_{D1}$ (2003) in the disk drive D3 (1603) and data $P_{D1}$ (2004) in the disk drive P (1604) based on the redundant data of data in the disk drive D1 (1601) which has caused a read error, transfers those data to the cache memory 1301 as data $D2_{D1}$ (2302), data $D3_{D1}$ (2303) and data $P_{D1}$ (2304) then restores the data $D1_{D1}$ (2301) in the disk drive D1 (1601) through redundancy calculation using the data $D2_{D1}$ (2302), data $D3_{D1}$ (2303) and data $P_{D1}$ (2304), and stores the restored data $D1_{D1}$ (2301) in the cache memory 1301.

Figure 17:
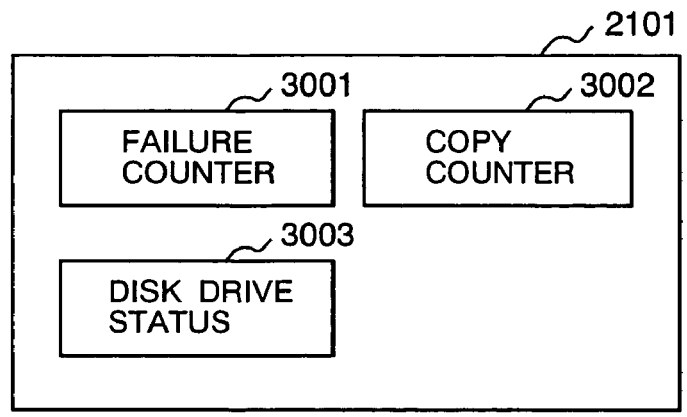
FIG. 17 is a diagram showing the details of a part of the drive structure according to the fifth embodiment of the invention.

FIG. 17 is a schematic diagram showing the structural elements of the disk drive information (2101).

The disk drive information 2101 comprises a failure counter (error counter) 3001 indicating the number of read errors occurred, a copy counter 3002 indicating the position at which copying to shift data to the disk drive S (1605) is completed, and a disk drive status 3003 indicating information on whether or not the disk drive is readable/writable. The initial values of the failure counter (error counter) 3001 and the copy counter 3002 are 0, and the initial value of the disk drive status 3003 is the "normal state".

Figure 18:
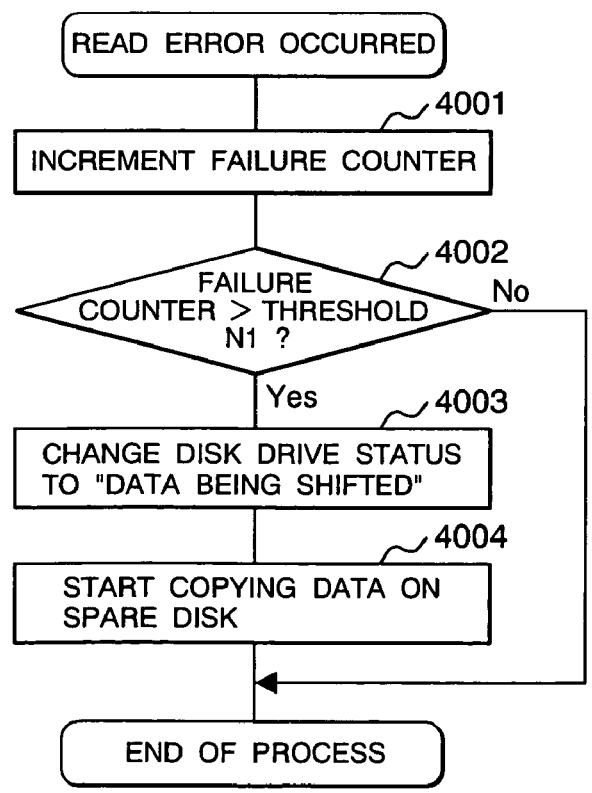
FIG. 18 is an operational flowchart according to the fifth embodiment of the invention.

FIG. 18 is a flowchart illustrating a status changing process in case where a data read error occurs in the disk drive D1 (1601) while the disk drive status in the disk drive information 2101 is the "normal state".

When data reading from the disk drive D1 (1601) is in error, the disk controller A (1401) or the disk controller B (1402) increments the failure counter 3001 in the disk drive information 2101 which concerns the disk drive D1 (1601) in the shared memory 1302 as mentioned above in step 4001. In the next step 4002, it is determined whether or not the failure counter 3001 exceeds a threshold N1. If the failure counter 3001 exceeds the threshold N1, the disk controller A (1401) or the disk controller B (1402) considers that the disk drive D1 (1601) is likely to become completely unreadable in near future, changes the disk drive status 3003 in the disk drive information 2101 to "data being shifted" in step 4003, reads data $D1_{D1}$ (2001) to $D1_{Dm}$ (200n) in the disk drive D1 (1601) onto the cache memory 1301 as data $D1_{D1}$ (2301) to $D1_{Dm}$ (230n) and sequentially writes them in the disk drive S (1605) to thereby shift the data in the disk drive D1 (1601) to the disk drive S (1605) in step 4004. At this time, the copy counter in the disk drive information 2101 is updated to Dm every shifting of data $D1_{Dm}$ (0≦Dm≦Dn) to the disk drive S (1605).

Figure 19:
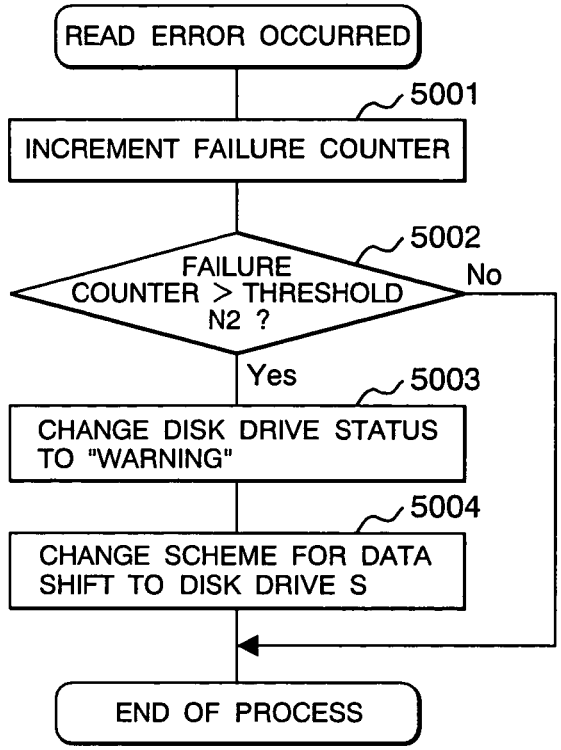
FIG. 19 is another operational flowchart according to the fifth embodiment of the invention.

FIG. 19 is a flowchart illustrating a status changing process in case where a data read error occurs in the disk drive D1 (1601) while the disk drive status in the disk drive information 2101 is "data being shifted".

When data reading from the disk drive D1 (1601) is in error, the disk controller A (1401) or the disk controller B (1402) increments the failure counter (error counter) 3001 in the disk drive information 2101 which concerns the disk drive D1 (1601) in the shared memory 1302 as mentioned above in step 5001. In the next step 5002, it is determined whether or not the failure counter (error counter) 3001 exceeds a threshold N2. If the failure counter 3001 exceeds the threshold N2, the disk drive status is changed to "warning", and changes the scheme of reading the data $D1_{D1}$ (2001) to $D1_{Dm}$ (200n) of the data-shifting disk drive from the disk drive D1 (1601) to the scheme of reading the data from the disk drives D2 to P (1602 to 1604) using the RAID function of the disk array and acquiring restored data through redundancy calculation in step 5004.

Figure 20:
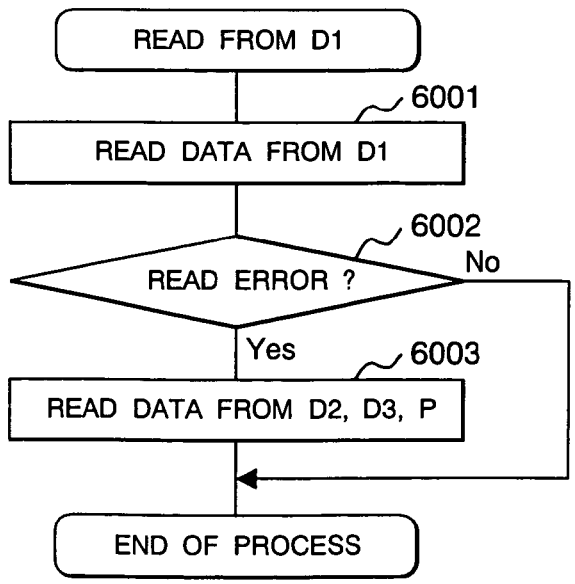
FIG. 20 is a different operational flowchart according to the fifth embodiment of the invention.

FIG. 20 is a flowchart illustrating the scheme of reading data $D1_{Dm}$ (0≦Dm≦Dn) from the disk drive D1 (1601) when the disk drive status 3003 in the disk drive information 2101 is "normal state" or "data being shifted".

In step 6001, data $D1_{Dm}$ is read from the disk drive D1 (1601) and is transferred to the cache memory 1301. In step 6002, it is determined whether a read error has occurred or not. When a read error has occurred, the data $D1_{Dm}$ in the disk drive D1 (1601) is generated using the disk drive D2 (1602), the disk drive D3 (1603) and the disk drive P (1604) which constitute the disk array group having the aforementioned redundancy in step 6003.

The following discusses the scheme of writing data $D1_{Dm}$ (0≦Dm≦Dn) in the disk drive D1 (1601) when the disk drive status 3003 in the disk drive information 2101 is "normal state" or "data being shifted". In case where update write data is $D1_{D1}$ (2301), the disk controller A (1401) or the disk controller B (1402) reads the data $D1_{D1}$ (2001), located at the associated block position in the disk drive D1 (1601), and stores it on the cache memory 1301 as old data $O1_{D1}$ (2311). Next, the disk controller A (1401) or the disk controller B (1402) reads the data $P_{D1}$ (2004) from the disk drive P (1604), and stores it on the cache memory 1301 as old parity data $P_{OD1}$ (2314). Then, the disk controller A (1401) or the disk controller B (1402) generates new parity data $P_{D1}$ (2304) through an exclusive-OR operation using the update data $D1_{D1}$ (2301), the old data $O1_{D1}$ (2311) and the old parity data $P_{OD1}$ (2314), and stores the new parity data $P_{D1}$ (2304) in the cache memory 1301. Next, the disk controller A (1401) or the disk controller B (1402) writes the update data $D1_{D1}$ (2301) in the disk drive D1 (1601) and the disk drive S (1605) and writes the previously generated new parity data $P_{D1}$ (2304).

Figure 21:
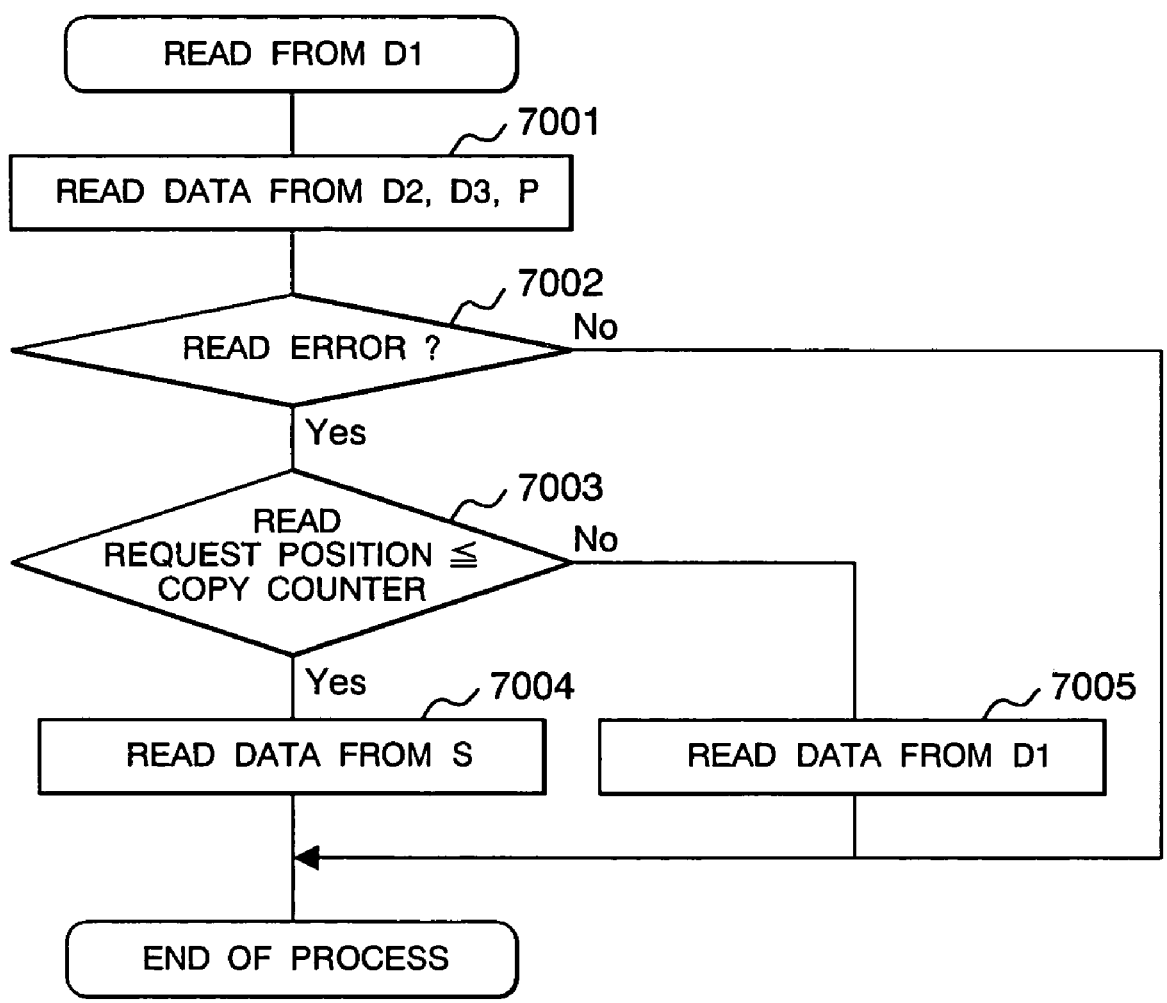
FIG. 21 is a flowchart illustrating a further principle of the invention according to the fifth embodiment of the invention.

FIG. 21 is a flowchart illustrating the scheme of reading data $D1_{Dm}$ (0≦Dm≦Dn) from the disk drive D1 (1601) when the disk drive status 3003 in the disk drive information 2101 is "warning".

In step 7001, the data $D1_{Dm}$ in the disk drive D1 (1601) is generated using the disk drive D2 (1602), the disk drive D3 (1603) and the disk drive P (1604) which constitute the disk array group having the aforementioned redundancy in step 6003. When a read error of data $DX_{Dm}$ (DX: D2 or D3 or P) occurs in any of the disk drives D2 to P (1602 to 1604) in step 7002, the data $DX_{Dm}$ is compared with the copy counter 3002 in the disk drive information 2101 in step 7003. When the data $DX_{Dm}$ is smaller than the copy counter 3002, which means that shifting of this data to the disk drive S (1605) has already been completed, the data $D1_{Dm}$ is read from the disk drive S in step 7004. When the data $DX_{Dm}$ is greater than the copy counter 3002, the data $D1_{Dm}$ is read from the disk drive D1 (1601) in step 7005. At this time, the data $DX_{Dm}$ which had a read error may be restored using the data $D1_{Dm}$. In case where data $D2_{Dm}$ has a read error, $D2_{DM}$ may be restored using $D1_{Dm}$, $D3_{Dm}$ and $P_{Dm}$ constituting the redundant disk array group, a switching medium area may be set in the disk drive D2 (1602) and $D2_{Dm}$ may be written in that area.

The following discusses the scheme of writing data $D1_{Dm}$ ($0 \leq Dm \leq Dn$) in the disk drive D1 (1601) when the disk drive status 3003 in the disk drive information 2101 is "warning". In case where write data is $D1_{D1}$ (2301), the disk controller A (1401) or the disk controller B (1402) reads the data $D2_{D1}$ (2002) and data $D3_{D1}$ (2003), which have redundancy at the associated blocks in the disk drive D2 (1602) and the disk drive D3 (1603), and stores them on the cache memory 1301 as old data $O2_{D1}$ (2312) and old data $O3_{D1}$ (2313), respectively. Then, the disk controller A (1401) or the disk controller B (1402) generates new parity data $P_{D1}$ (2304) through an exclusive-OR operation using the update data $D1_{D1}$ (2301), the old data $O2_{D1}$ (2312) and the old data $O3_{D1}$ (2313), and stores the new parity data $P_{D1}$ (2304) in the cache memory 1301. Next, the disk controller A (1401) or the disk controller B (1402) writes the update data $D1_{D1}$ (2301) in the disk drive D1 (1601) and the disk drive S (1605) and writes the previously generated new parity data $P_{D1}$ (2304).

What is claimed is:

1. A storage system comprising:
   a plurality of disks including first disks configuring a RAID group and at least one second disk, wherein each of the first disks stores one of data received from a computer coupled to the storage system or parity data used for recovering the data received from the computer, and wherein the at least one second disk is to be used as a spare disk; and
   a control section configured to hold an error status of each of the first disks, and to start to mirror data between one of the first disks and the at least one second disk when the error status of the one of the first disks matches a predetermined first criterion,
   wherein, after starting to mirror data between the one of the first disks and the at least one second disk, the control section is configured to stop mirroring data between the one of the first disks and the at least one second disk, before completing mirroring data between the one of the first disks and the at least one second disk, and start to mirror data between another one of the first disks and the at least one second disk, according to the error status of the one of the first disks and the another one of the first disks.

2. A storage system according to claim 1, wherein the control section is configured to compare the error status of each of the first disks, and based on the result of error status comparison between the one of the first disks and the another one of the first disks, the control section is configured to stop mirroring data between the one of the first disks and the at least one second disk and start to mirror data between the another one of the first disks and the at least one second disk.

3. A storage system according to claim 1, wherein when the error status of one of the first disks matches a predetermined second criterion, the control section is further configured to stop mirroring between the one of the first disks and the at least one second disk and configure a RAID group including the at least one second disk instead of the one of the first disks.

4. A storage system according to claim 3, wherein the error status of each of the first disks is an error count of each of the first disks, and both of the predetermined first criterion and the predetermined second criterion are predetermined values of the error count.

5. A storage system according to claim 4, wherein the value of the error count for the predetermined first criterion is zero, whereby the control section is configured to mirror data between the one of the first disks and the at least one second disk initially.

6. A storage system according to claim 4, wherein the error count for the first criterion is updated according to the change of the error status of the first disks configuring a RAID group.

7. A storage system according to claim 1, wherein the error status of each of the first disks is an error count of each of the first disks, and
   when the error count of the another one of the first disks becomes larger than the error count of the one of the first disks, the control section is configured to stop mirroring data between the one of the first disks and the at least one second disk and start to mirror data between the another one of the first disks and the at least one second disk.

8. A storage system according to claim 1, wherein information indicating a pair of disks configuring a mirroring pair is output from the storage system to a management computer coupled to the storage system.

9. A storage system according to claim 1, wherein the predetermined first criterion is updated based on the error status of the first disks configuring a RAID group.

10. A storage system according to claim 1, wherein the control section is configured to start to mirror data between said another one of the first disks and the at least one second disk before a plan of mirroring data between said one of the first disks and the at least one second disk is completed.

11. A storage system according to claim 1, wherein the control section is configured to start to mirror data between said another one of the first disks and the at least one second disk, if the error status of said another one of the first disks is greater than or equal to the error status of said one of the first disks.

12. A storage system comprising:
    a plurality of disks including first disks configuring a RAID group and at least one second disk, wherein each of the first disks stores one of data received from a computer coupled to the storage system or parity data used for recovering the data received from the computer, and
    a control section configured to hold an error status of each of the first disks, and to start to mirror data between one of the first disks and the at least one second disk when the error status of the one of the first disks matches a predetermined first criterion, wherein, after starting to mirror data between the one of the first disks and the at least one second disk, the control section is configured to stop mirroring data between the one of the first disks and the at least one second disk, before completing mirroring data between the one of the first disks and the at least one second disk, and start to mirror data between another one of the first disks and the at least one second disk, according to the error status of the one of the first disks and the another one of the first disks.

13. A storage system according to claim 12, wherein
the control section is configured to compare the error status of each of the first disks, and
based on the result of error status comparison between the one of the first disks and the another one of the first disks, the control section is configured to stop mirroring data between the one of the first disks and the at least one second disk and start to mirror data between the another one of the first disks and the at least one second disk.

14. A storage system according to claim 12, wherein
when the error status of one of the first disks matches a predetermined second criterion, the control section is further configured to stop mirroring between the one of the first disks and the at least one second disk and configure a RAID group including the at least one second disk instead of the one of the first disks.

15. A storage system according to claim 14, wherein
the error status of each of the first disks is an error count of each of the first disks, and both of the predetermined first criterion and the predetermined second criterion are predetermined values of the error count.

16. A storage system according to claim 15, wherein
the value of the error count for the predetermined first criterion is zero, whereby the control section is configured to mirror data between the one of the first disks and the at least one second disk initially.

17. A storage system according to claim 15, wherein the error count for the first criterion is updated according to the change of the error status of the first disks configuring a RAID group.

18. A storage system according to claim 12, wherein
the error status of each of the first disks is an error count of each of the first disks, and
when the error count of the another one of the first disks becomes larger than the error count of the one of the first disks, the control section is configured to stop mirroring data between the one of the first disks and the at least one second disk and start to mirror data between the another one of the first disks and the at least one second disk.

19. A storage system according to claim 12, wherein information indicating a pair of disks configuring a mirroring pair is output from the storage system to a management computer coupled to the storage system.

20. A storage system according to claim 12, wherein the predetermined first criterion is updated based on the error status of the first disks configuring a RAID group.

21. A storage system according to claim 12, wherein the control section is configured to start to mirror data between said another one of the first disks and the at least one second disk before a plan of mirroring data between said one of the first disks and the at least one second disk is completed.

22. A storage system according to claim 12, wherein the control section is configured to start to mirror data between said another one of the first disks and the at least one second disk, if the error status of said another one of the first disks is greater than or equal to the error status of said one of the first disks.

* * * * *